(12) United States Patent
Kubo et al.

(10) Patent No.: US 8,876,093 B2
(45) Date of Patent: Nov. 4, 2014

(54) LIQUID SEALED VIBRATION ISOLATING DEVICE

(75) Inventors: Nobuo Kubo, Wako (JP); Taiyo Gon, Wako (JP); Jun Saito, Fujimino (JP); Shunji Nagakura, Fujimino (JP); Yasuharu Akai, Fujimino (JP)

(73) Assignees: Honda Motor Co. Ltd., Tokyo (JP); Yamashita Rubber Kabushiki Kaisha, Fujimino-Shi (JP)

( * ) Notice: Subject to any disclaimer, the term of this patent is extended or adjusted under 35 U.S.C. 154(b) by 260 days.

(21) Appl. No.: 13/578,647

(22) PCT Filed: Feb. 23, 2011

(86) PCT No.: PCT/JP2011/053921
§ 371 (c)(1),
(2), (4) Date: Aug. 13, 2012

(87) PCT Pub. No.: WO2011/105404
PCT Pub. Date: Sep. 1, 2011

(65) Prior Publication Data
US 2012/0299229 A1 Nov. 29, 2012

(30) Foreign Application Priority Data

Feb. 25, 2010 (JP) ................................ 2010-040902
Apr. 16, 2010 (JP) ................................ 2010-095511

(51) Int. Cl.
*F16F 9/00* (2006.01)
*F16F 13/10* (2006.01)

(52) U.S. Cl.
CPC .................................. *F16F 13/106* (2013.01)
USPC .................................................. 267/140.13

(58) Field of Classification Search
USPC ............................. 267/140.11–140.14, 140.3
See application file for complete search history.

(56) References Cited

U.S. PATENT DOCUMENTS

| 2010/0072683 A1* | 3/2010 | Saito et al. | 267/140.13 |
| 2011/0101581 A1* | 5/2011 | Kubo et al. | 267/140.13 |
| 2012/0049423 A1* | 3/2012 | Ishikawa et al. | 267/140.13 |

FOREIGN PATENT DOCUMENTS

| JP | 2005048906 A | * | 2/2005 |
| JP | 2008-202765 |   | 9/2008 |
| JP | 2009-002420 |   | 1/2009 |

* cited by examiner

*Primary Examiner* — Melanie Torres Williams
(74) *Attorney, Agent, or Firm* — Rankin, Hill & Clark LLP

(57) ABSTRACT

A partition member is provided with an elastic body for absorbing hydraulic pressure fluctuation of the primary liquid chamber and a frame member for supporting an outer circumferential portion of the elastic body while aiming to prevent the rotation of the elastic body. A relief aperture communicating between the primary liquid chamber and the secondary liquid chamber is located on the outer circumferential side in the elastic body supporting region of the frame member. A relief valve for opening and closing the relief aperture is integrally formed on the outer circumferential side of the elastic body. The relief valve is formed of a pair of right and left relief valves. A width across flat sections are formed on a thick-walled outer circumferential section of the elastic body which is located between the right and left relief valves, such as to serve as a detent means.

9 Claims, 25 Drawing Sheets

LIQUID SEALED VIBRATION ISOLATING DEVICE

BACKGROUND OF THE INVENTION

1. Field of the Invention

The present invention relates to a liquid sealed vibration isolating device for use in a power train mount for a motor vehicle, and more particularly, to the device capable of effectively decreasing noises produced by a cavitation phenomenon and of realizing high damping.

2. Description of the Related Art

In an engine mount for a motor vehicle constructed of a liquid sealed vibration isolating device, the reversal of vibration direction after great force input develops negative pressure within a primary liquid chamber so as to produce bubbles in a hydraulic liquid. Then, a high noise may be produced by a cavitation phenomenon that these bubbles burst. Therefore, there is proposed the device comprising the liquid chamber which is partitioned into the primary liquid chamber and a secondary liquid chamber, and a relief valve which is provided in a partition member having an orifice passage. This relief valve is opened at the time of such great force input that the cavitation phenomenon occurs, to relieve the hydraulic liquid so that the occurrence of the cavitation phenomenon is prevented.

Moreover, there is proposed another device comprising the partition member which has a metallic frame member and an elastic body which is engaged in and supported by the frame member. A central section of the elastic body is formed as a thin-walled circular movable diaphragm section so as to absorb the hydraulic pressure fluctuation of the primary liquid chamber, while an outer circumferential section is formed of a thick wall such that the relief valve is integrally provided with this outer circumferential section.

In this case, the force in the rotational direction (the direction of an arrow A in FIG. 10) is applied to the elastic body by the hydraulic liquid which flows into the orifice passage while swirling, so that the elastic body rotates relative to the frame member. Then, the relief valve may be out of alignment with the relief passage to thereby cause inaccurate opening and closing so that the prevention of the occurrence of the cavitation phenomenon becomes unreliable. Therefore, there is known the art that a thick-walled projection is provided on the outer circumferential section of the elastic body and fixed on the frame member to serve as a detent means (see a patent reference 1).

Further, in this case, the relief valves are provided at regular intervals in the circumferential direction. The length in the circumferential direction (circumference) of each of the relief valves is about ⅙ (a sixth) of the full circumference at a divergent angle of about 60° from the center.

Patent reference 1: Japanese patent laid open publication No. JP 2009-2420 A.

PROBLEM TO BE SOLVED BY THE INVENTION

In the elastic body provided with the detent construction as above, the relief valve is provided four pieces at intervals of 90° in the circumferential direction of the elastic body, and the projection serving as the detent means is provided between the neighboring relief valves. However, since the projection serving as the detent means projects merely partially from the outer circumferential section, it is difficult to keep the shape against the great force. Therefore, there may be cases where the projection is deformed at the time of the great force input so that the accurate prevention of rotation is not performed. To realize the accurate prevention of rotation, it is thought that the projection is increased in size to provide high rigidity so as not to be deformed at the time of the great force input. However, since it is required to make the relief valve as large as possible in order for maintaining a large amount of flow of the hydraulic liquid at the time of relief, there are restrictions on the increase in size of the projection serving as the detent means for providing the high rigidity.

Further, when the elastic body slips off relative to the relief valve due to rotation or the like at the time of the great force input, the relief passage is narrowed to reduce the relief flow of the hydraulic liquid from the secondary liquid chamber to the primary liquid chamber at the time of relief. As a result, there may be cases where the reduction of the negative pressure level (to return the negative pressure to the positive pressure) within the primary liquid chamber becomes difficult, whereby the occurrence of the cavitation phenomenon can not be accurately prevented. The same goes for slipping off of the relief valve when assembling.

Moreover, when the relief valve located in the central section is elastically deformed large to the secondary liquid chamber side at the time of large vibration input, portions of the circumferential section of the elastic body which form both ends in the longitudinal direction of the relief valve and which are fixed on the frame member are pulled and elastically deformed to the middle section side in the longitudinal direction of the relief valve. Then, there may be cases where the deformation at this time develops a gap between the relief valve and the frame member thereby to decrease damping force due to the leak of the hydraulic liquid.

Furthermore, when the relief valve is elastically deformed at the time of the great force input, a portion of the relief valve may develop the decrease in sealing performance due to the local deformation so as to cause the leak of the hydraulic liquid whereby the damping force is decreased.

In addition, in the case where the relief valve is increased in size, the relief valve itself may be elastically deformed large when the great force is inputted, so that the hydraulic pressure within the primary liquid chamber is reduced too much thereby to decrease the damping force.

Accordingly, it is an object of the present invention to reliably prevent the cavitation phenomenon in such a manner that the slip off of the elastic body provided in the partition member can be steadily prevented thereby to have the elastic body fixed in a proper position, and at the same time, to make it possible to realize the high damping.

Further, like the prior art as described above, when the relief valve is formed integral with the outer circumferential thick wall section of the elastic body, the arrangement and formation of the relief valve will be facilitated. However, since the relief valve is provided in the form of a circular arc in the circumferential direction of the outer circumferential thick wall section, the both ends in the longitudinal direction are in series connected to the thick wall section and have high flexural rigidity, thereby to offer resistance to the opening and closing operation of the relief valve. Similarly, since there are provided four pieces of relief valve, the number of such resisting portions at the time of opening and closing the relief valve is increased. Provided that such resistance is reduced to allow the relief valve to be smoothly opened and closed, when the control of the cavitation phenomenon is required, the relief valve is opened smoothly to supply the hydraulic liquid sufficiently and rapidly from the secondary liquid chamber to the primary liquid chamber, whereby the occurrence of the cavitation phenomenon can be controlled. Accordingly, the reduction in the number of the resisting portions at the time of opening and closing the relief valve is required.

Furthermore, in this type of liquid sealed vibration isolation device, it is required that the movable diaphragm section of rubber spring is easy to absorb the hydraulic pressure fluctuation of the primary liquid chamber so as to be constituted of low dynamic spring constant to decrease the transmission amount of the vibration. However, since the movable diaphragm section is surrounded by and formed inside the relief valves of the outer circumferential section, it has to be comparatively small in area and high in spring constant to a certain degree.

On the other hand, to lower the spring constant of the movable diaphragm section may be thought as one of methods for realizing the low dynamic spring constant. Then, it is thought that the pressure receiving area of the movable diaphragm section facing the primary liquid chamber is enlarged or that the diaphragm section is thinned.

However, the area of the movable diaphragm section is comparatively small because the relief valves are formed on the circumferential section while meeting the basic requirements for making the whole vibration isolation device compact. Therefore, the area of the movable diaphragm section can not be freely enlarged.

Besides the above, there is a certain limit to the thickness of the movable diaphragm section. When thinning the movable diaphragm section without limitation, there is caused the great decrease in damping force. Therefore, there is a limit to thinning it.

As a result, in the vibration isolating device of the type that the relief valves are provided on the outer circumferential section, there is the real situation that it is difficult to make the movable diaphragm section low spring for realizing the low dynamic spring constant.

Therefore, with respect to the partition member provided with the movable diaphragm section having the relief valves on the outer circumferential section thereof, it is another object of the present invention to reduce the number of resisting portions at the time of opening and closing the relief valve so as to perform smoother opening and closing operation, and to make the movable diaphragm section low spring for realizing the low dynamic spring constant by enlarging the pressure receiving area of the movable diaphragm section without enlarging the size of the outer circumference of the whole device.

SUMMARY OF THE INVENTION

A liquid sealed vibration isolating device according to a first aspect of the present invention comprises a liquid chamber being partitioned into a primary liquid chamber and a secondary liquid chamber, a partition member having an orifice passage which communicates between the primary liquid chamber and the secondary liquid chamber, an elastic body, a frame member for fitting the elastic body therein and supporting it thereon, the elastic body having a thin-walled movable diaphragm section provided in a central section thereof and a thick-walled outer circumferential section provided on a circumference of the movable diaphragm section, and a relief valve being integrally formed with the thick-walled outer circumferential section, wherein only a pair of relief valves is arranged in opposed relation to each other across a center of the elastic body, and a noncircular shaped detent section is formed on an outer circumferential portion of the thick-walled outer circumferential section which is located between the pair of relief valves, and wherein an engaging section corresponding to the detent section is provided on the frame member, and the detent section is engaged with the engaging section by fitting the elastic body into the frame member.

According to a second aspect of the present invention, the movable diaphragm section is formed in a noncircular shape such that a portion of the movable diaphragm section extends into the thick-walled outer circumferential section located between the pair of relief valves.

According to a third aspect of the present invention, the detent section is formed in a width across flat shape comprising straight lines which extend in parallel to each other in opposite positions of an outer circumference of the thick-walled outer circumferential section of the elastic body.

According to a fourth aspect of the present invention, a circular arc shaped relief aperture is located in a position corresponding to the relief valve of the frame member, and an intermediate support portion for supporting the relief valve is formed in an intermediate position in a longitudinal direction of the relief aperture.

According to a fifth aspect of the present invention, in the fitting region between the elastic body and the frame member, at least a portion of the detent section of the elastic body and at least a portion of the engaging section of the frame member are formed in a taper shape.

According to a sixth aspect of the present invention, a corner section of the elastic body adjacent to an end in the longitudinal direction of the relief valve and a corner section of the frame member provided to be engaged with the corner section of the elastic body are formed in a taper shape, respectively.

According to a seventh aspect of the present invention, an intermediate support for supporting a portion of the relieve valve on the side of the secondary liquid chamber is formed on the frame member.

According to an eighth aspect of the present invention, a concave portion which forms the orifice passage is formed on the frame member with its outer lateral side open, and a closing member which closes the outer lateral side of the concave portion and the outer circumferential portion of the orifice passage serves as a cover member for covering each of the outsides of the liquid chamber and the partition member.

According to a ninth aspect of the present invention, the relief valve is formed in a circular arc shape along an imaginary circle and is about ⅓ (a third) in length of a full circumference of the imaginary circle in the circumferential direction of the elastic body.

EFFECTS OF THE INVENTION

According to the first aspect of the present invention, the relief valve which is formed in a long circular arc shape in the circumferential direction on the thick-walled outer circumferential section of the elastic body comprises only one pair of oppositely arranged relief valves. Therefore, in comparison with the case where four relief valves are provided as seen in the prior art, the number of the longitudinal ends which are difficult to be opened and closed can be reduced by half so that the smooth opening and closing operation can be performed. Besides, the whole of the portion of the thick-walled outer circumferential section of the elastic body which is located between the pair of relief valves is formed in a noncircular shape in a plan view to serve as the detent section. The whole thick-walled outer circumferential section located between the pair of relief valves is used for supporting and fixing the relief valve by having the elastic body engaged with the frame member which has the engaging section corresponding to the detent section, whereby the supporting and fixing section of the relief valve can have a high degree of supporting rigidity. Therefore, since the elastic body is properly positioned relative to the frame member so as to keep the condition of the relief passage constant, the predetermined amount of flow can be surely maintained under the conditions subject to occurrence of the cavitation phenomenon, so that the occurrence of the cavitation phenomenon can be steadily prevented.

In addition, it is possible to make the device compact without increasing the size of the outer diameter thereof and also because of the low dynamic spring constant, the movable diaphragm section can maintain the predetermined damping capacity and durability without making it excessively thinner.

According to the second aspect of the present invention, since a portion of the movable diaphragm section extends into the thick-walled outer circumferential section located between the pair of relief valves, and the movable diaphragm section is formed in a noncircular shape, the movable diaphragm section can be formed in a noncircular large-sized construction to enlarge the pressure receiving area. Although the relief valve is provided on the outer circumferential section, the spring constant of the movable diaphragm section can be lowered so as to make it possible to realize the low dynamic spring constant. Thus, the relief valve can be smoothly opened and closed, and at the same time, the low dynamic spring constant can be realized.

According to the third aspect of the present invention, since the detent section is formed in a width across flat shape comprising straight lines which extend in parallel to each other in the opposite positions of the thick-walled outer circumferential section of the elastic body, it is possible to obtain the simple and reliable detent construction.

According to the fourth aspect of the present invention, although the relief valve comprises only one pair and is increased in size, the intermediate portion of the relief valve is supported by the intermediate support portion so that the intermediate portion of the relief valve is prevented from being large deformed. Therefore, the substantial use of the large-sized relief valve can be allowed and an interval between the pair of the relief valves with respect to the thick-walled outer circumferential section can be sufficiently enlarged.

According to the fifth aspect of the present invention, since at least a portion of the detent section and at least a portion of the engaging section are formed in a taper shape, the partition member can be easily assembled by taper joining when the detent section is engaged with the engaging section. As a result, it is possible to enhance the sealing performance of the taper joining portion. When the great force is applied to the outer circumferential section of the elastic body at the time of the great force input, a high liquid sealed condition is maintained between the outer circumferential section of the elastic body and the frame member each of which is taper joined together. Thus, since the liquid leak from the taper joining portion is prevented, the decrease in damping force can be prevented.

According to the sixth aspect of the present invention, since with respect to the engaging section between the elastic body and the frame member, the corner sections adjacent to the end in the circumferential direction of the relief valve are formed in a taper shape, the elastic body can be accurately positioned relative to the frame member by means of taper joining. Therefore, the relief passage can be formed accurately whereby the occurrence of the cavitation phenomenon can be surely prevented. Also, since the high sealing performance in the taper joining portion is obtained, the liquid leak at the corner sections adjacent to the relief valve, which are subject to the elastically deforming force, can be prevented by the taper joining portion.

According to the seventh aspect of the present invention, since the intermediate support for supporting the secondary liquid chamber side of the relieve valve is formed on the frame member, the excessive deformation of the relief valve at the time of the great force input can be prevented thereby to prevent the decrease in damping force. Besides, in the case where the relief valve is formed long, the decrease in damping force can be prevented in the similar way. Thus, by making each of the relief valves longer only a pair suffices for the number of the relief valve whereby it is possible to reduce the number.

According to the eighth aspect of the present invention, since means for closing the outer lateral side of the concave portion which forms the orifice passage is not provided on the frame member but is comprised of the cover member for covering each of the outsides of the liquid chamber and the partition member, the orifice passage 108 can be arranged as close to the outer circumference as the means for closing the outer lateral side of the concave portion to form the orifice passage which is removed from the frame member. Therefore, the relief valve can be made larger in size and a portion corresponding to an enlarged area of the thick-walled outer circumferential section can be formed large enough.

According to the ninth aspect of the present invention, since the relief valve is elongated by about one-third of the imaginary circle along which the circular arc extends, the amount of the hydraulic liquid flow at the time of being relieved can be increased so as to effectively prevent the occurrence of the cavitation phenomenon.

DETAILED DESCRIPTION OF THE EMBODIMENT

Hereinafter, the embodiment of a liquid sealed vibration isolating device formed as an engine mount for a motor vehicle which is an example of a power train mount will be described with reference to the accompanying drawings.

Figure 1:
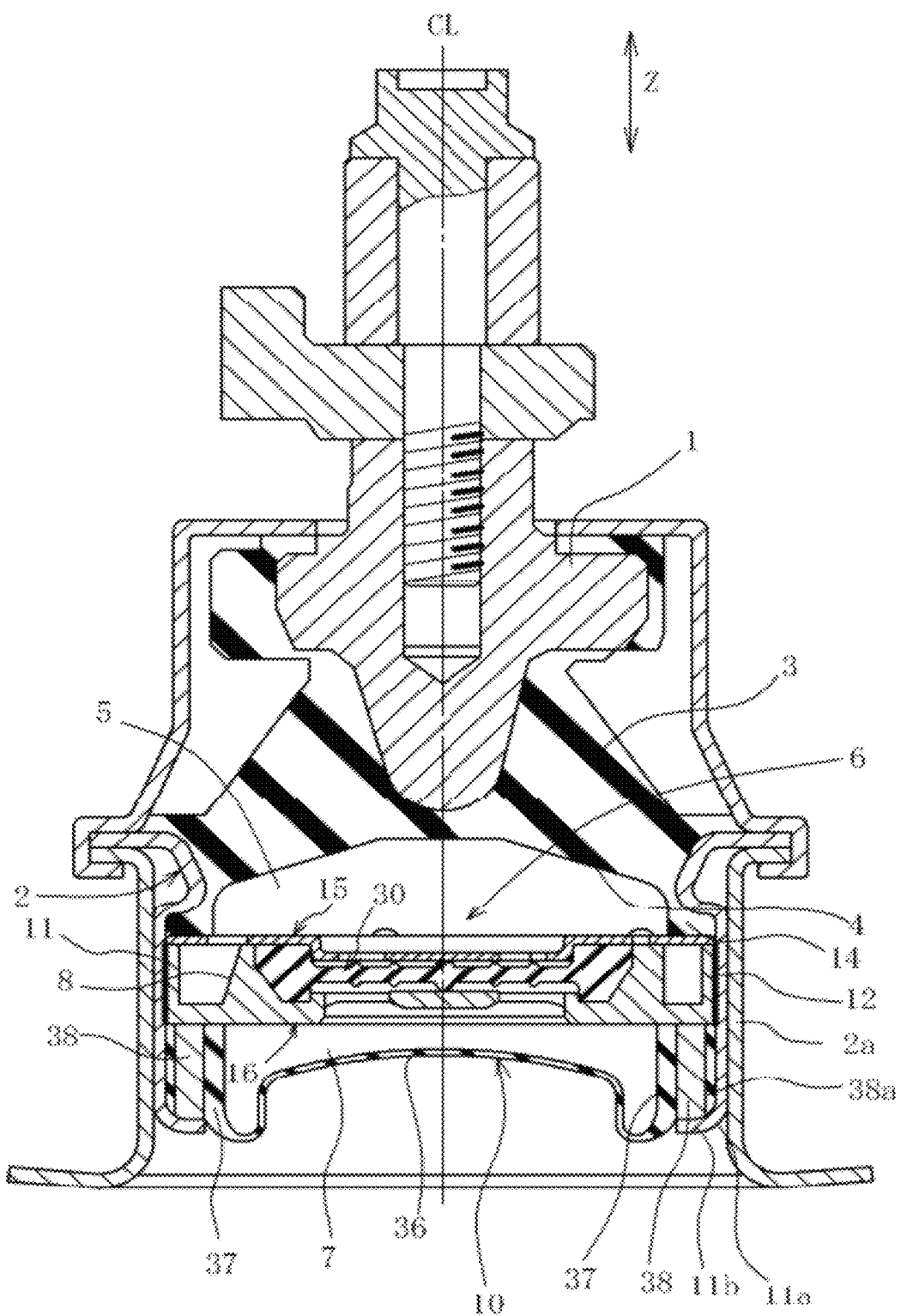
FIG. 1 is a cross sectional view of a liquid sealed vibration isolating device according to a first embodiment of the present invention.

FIG. 1 is a cross sectional view taken on a central axis CL of the liquid sealed vibration isolating device in accordance with the first embodiment of the present invention. This engine mount comprises a first mounting member 1 mounted on the side of an engine (not shown) as a vibration source, a second mounting member 2 mounted on a vehicle body (not shown) as a vibration receiving side, and an insulator 3 adapted to connect the first and second mounting members.

The insulator 3 is formed of a publicly known vibration isolating elastic member such as rubber or the like and is an elastic body which is a main vibration isolating means against vibration. The vibration inputted to the first mounting member 1 in the main vibration inputting direction Z is absorbed firstly by the elastic deformation of the insulator 3. The main vibration inputting direction Z runs parallel to the center line CL as shown in the drawing. By the way, in the description hereunder the illustration viewed from an upper side of the drawing along the direction Z will be described as a plan view.

The insulator 3 is formed substantially in the shape of a frustum of a cone in cross section and provided with a dome-shaped portion 4 on the inside thereof. A concave portion which is opened downward in FIG. 1 is formed by the dome-shaped portion 4. Into this concave portion an incompressible hydraulic liquid is filled thereby to form a primary liquid chamber 5.

The primary liquid chamber 5 is divided from a secondary liquid chamber 7 by a partition member 6 and communicates through an orifice passage 8 with the secondary liquid chamber 7 while being spaced apart from the latter by the partition member 6. The secondary liquid chamber 7 is formed between a diaphragm section 10 and the partition member 6 and uses the diaphragm section 10 as a portion of its wall.

The partition member 6 has the orifice passage 8, a movable diaphragm section (described later) for absorbing the hydraulic pressure fluctuation of the primary liquid chamber 5, and a relief valve (described later) for relieving the hydraulic liquid from the secondary liquid chamber 7 to the primary liquid chamber 5 at the time of great force input. The orifice passage 8 serves as a damping orifice which is set such as to resonate with the vibration of low frequency like a shake vibration, etc. of about 10~11 Hz, for example.

The second mounting member 2 is provided with an outer cylindrical metal fitting 11. This outer cylindrical metal fitting 11 is fitted into a holder 2a or mounted through a bracket on the vehicle body, depending on the situation. The outer cylindrical metal fitting 11 forms a part of the second mounting member 2.

United with the inside of the outer cylindrical metal fitting 11 is an extending portion 12 of the insulator 3. The extending portion 12 extends downward to substantially the same level as the height of the partition member 6 thereby to cover and be united with an inner wall of the outer metal fitting 11. Between the extending portion 12 and an outer circumferential portion of the partition member 6 there is formed a certain gap (not shown). On an upper portion of the extending portion 12 facing the primary liquid chamber 5 is formed a thick-walled step portion 14 by which the outer circumferential portion of the partition member 6 is fixed in position.

The diaphragm section 10 has a thin wall portion 36 as a main body and a thick wall portion 37 which is integrally formed with an outer circumferential portion of the thin wall portion. A fixing ring 38 is inserted into and united with the thick wall portion 37. A seal portion 38a which forms a portion of the thick wall portion 37 protrudes radially outward from an outer circumferential surface of the fixing ring 38. The fixing ring 38 is inserted through the seal portion 38a into the inside of the outer cylindrical metal fitting 11 and fastened thereto by caulking.

When assembling the engine mount, the first mounting member 1, the second mounting member 2 and the insulator 3 each shown in FIG. 1 are assembled in a state of turning upside down thereby to form a sub-assembled unit. In a state of turning upside down, the partition member 6 is inserted into the inside of the outer cylindrical metal fitting 11 from the upper side and fixed in position by the step portion 14. After that, the fixing ring 38 of the diaphragm section 10 is allowed to abut on the upper surface of the partition member 6 in a state of inserting the fixing ring 38 into the inside of the outer cylindrical metal fitting 11. Then, after drawing the outer cylindrical metal fitting 11, a lower end 11a forming a distal end of the outer cylindrical metal fitting 11 is bent inward to form a bent portion 11b. When the fixing ring 38 is pressed by caulking, all of the parts are assembled together into a unit.

Next, the partition member 6 will be described further.

Figure 2:
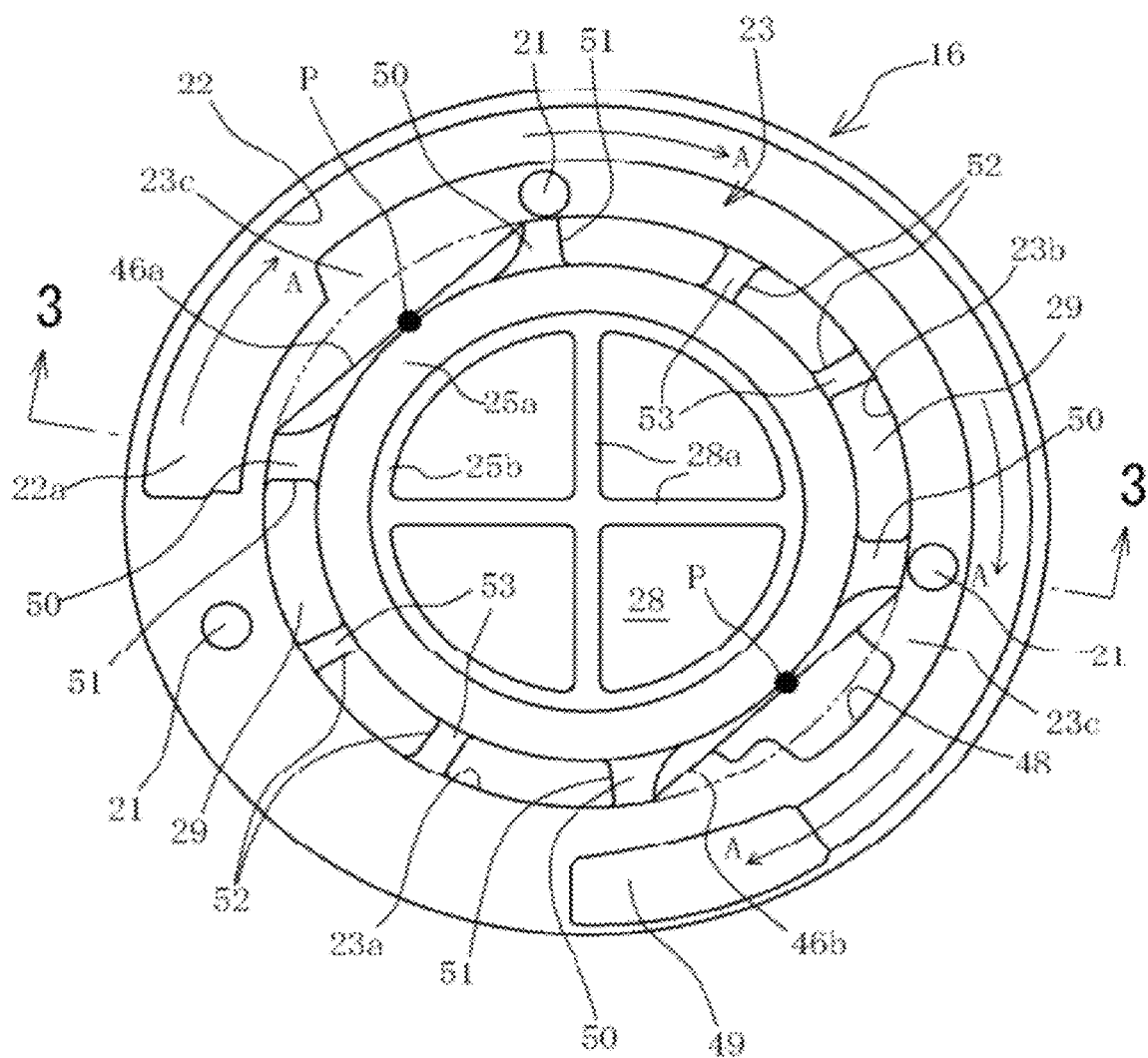
FIG. 2 is a plan view of a frame member.
Figure 3:
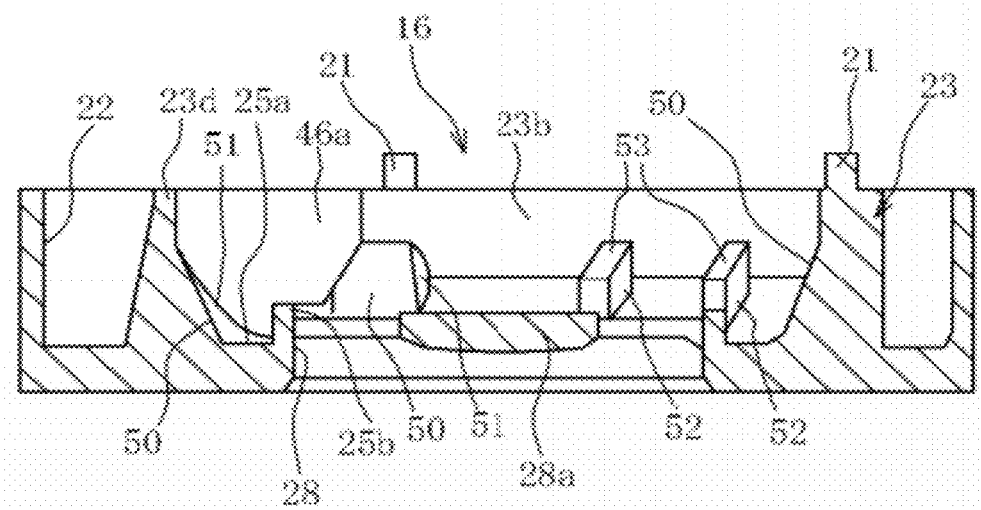
FIG. 3 is a cross sectional view taken along line 3-3 of FIG. 2.
Figure 4:
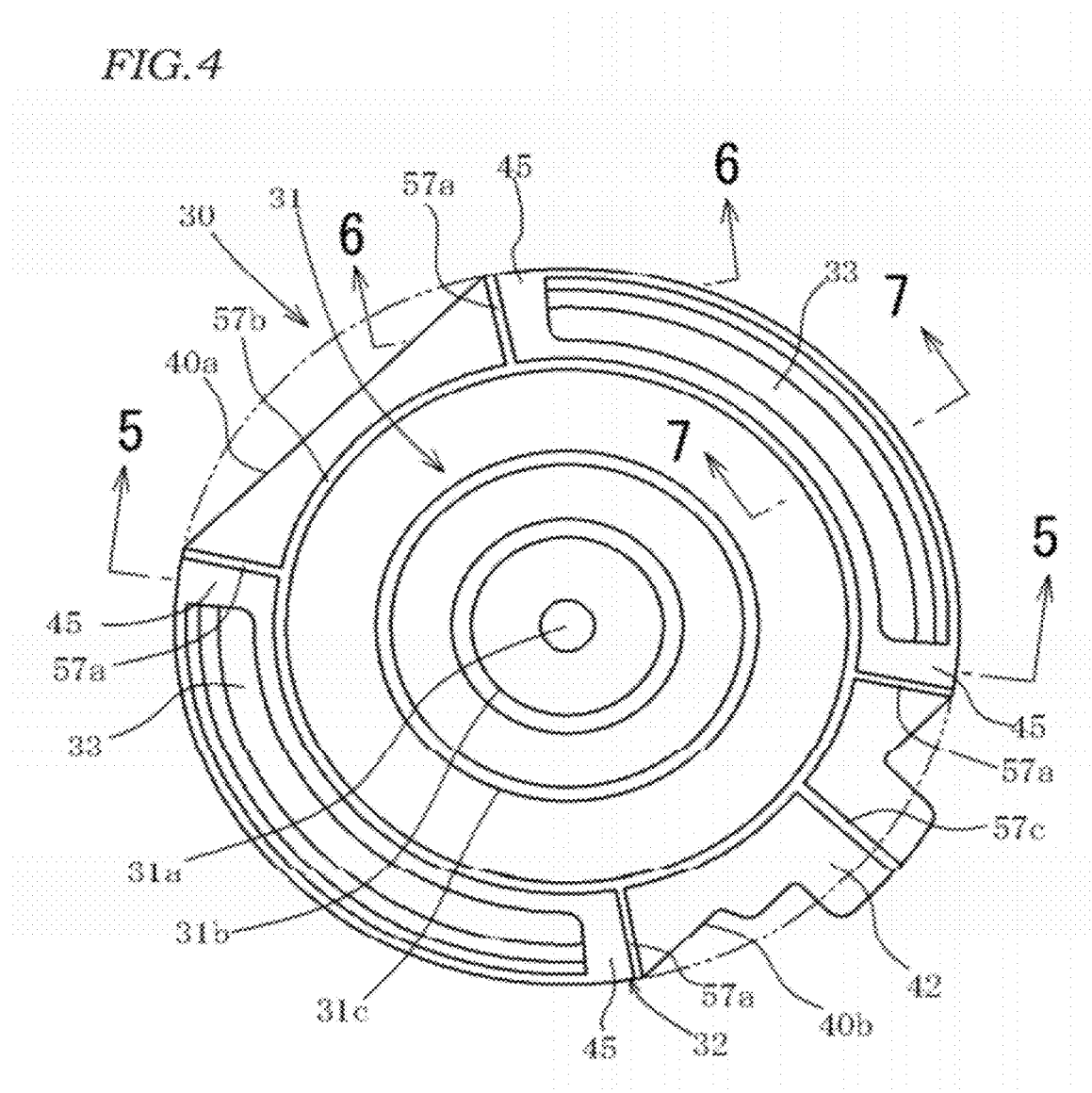
FIG. 4 is a plan view of an elastic body.
Figure 5:
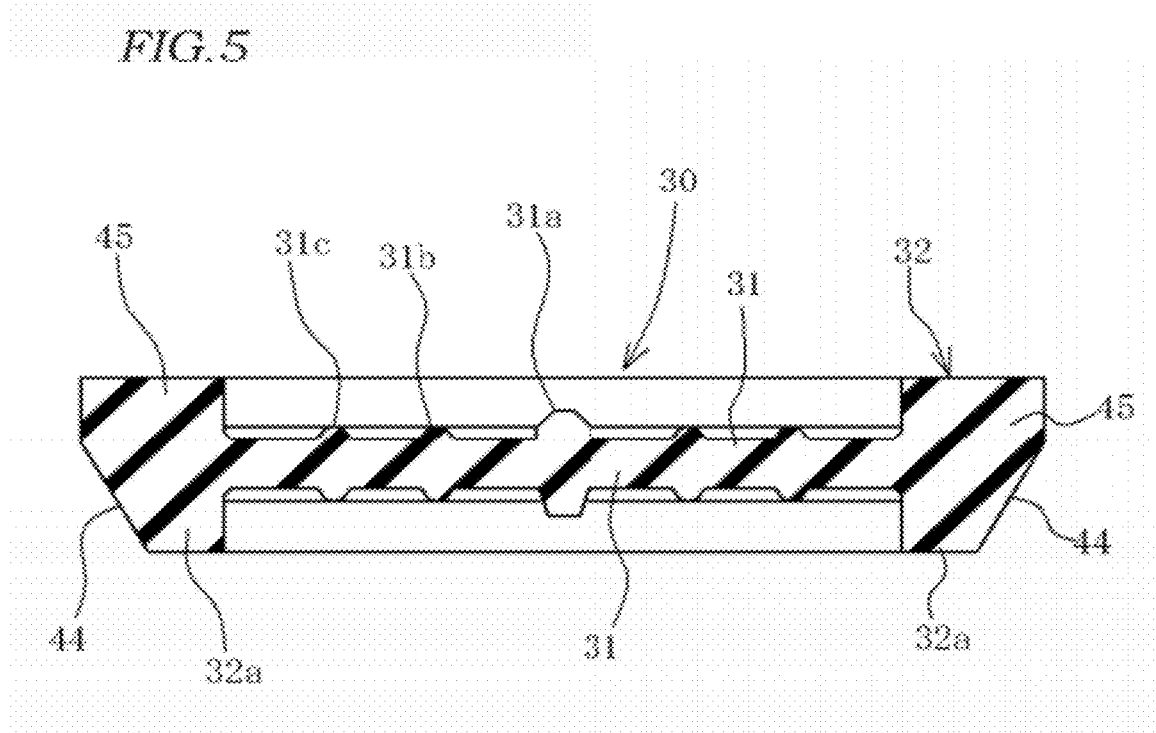
FIG. 5 is a cross sectional view taken along line 5-5 of FIG. 4.
Figure 6:
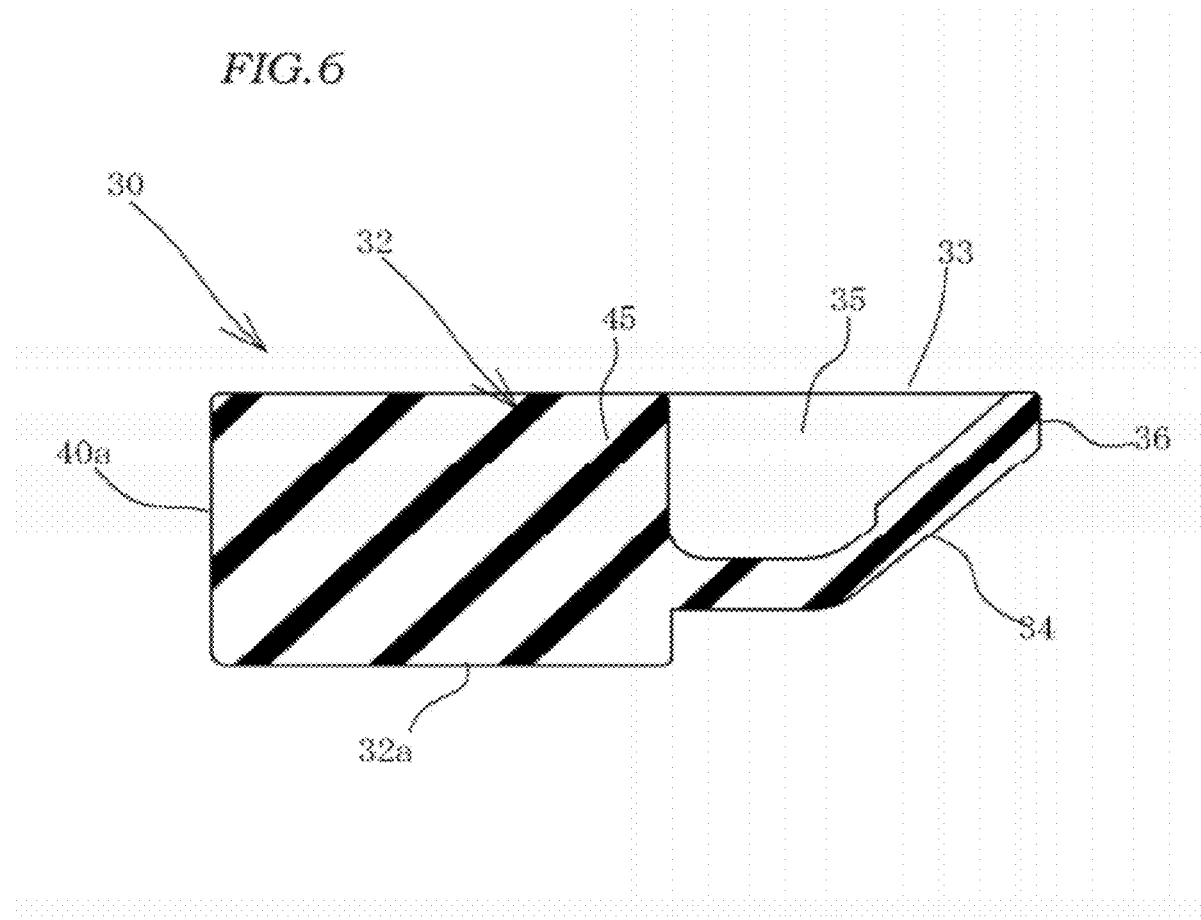
FIG. 6 is a cross sectional view taken along line 6-6 of FIG. 4.
Figure 7:
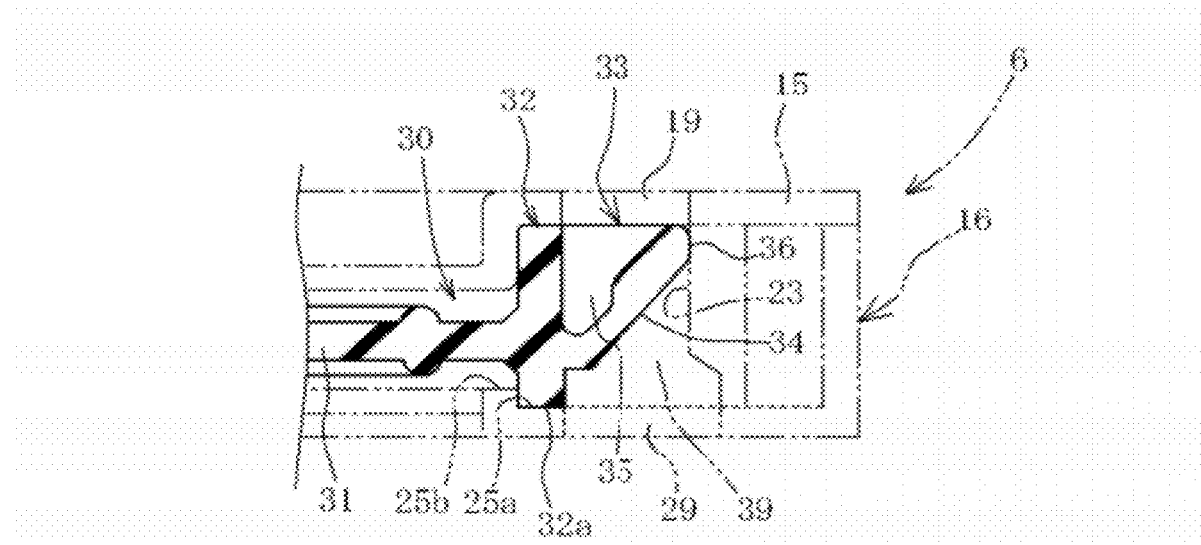
FIG. 7 is a cross sectional view taken along line 7-7 of FIG. 4.
Figure 8:
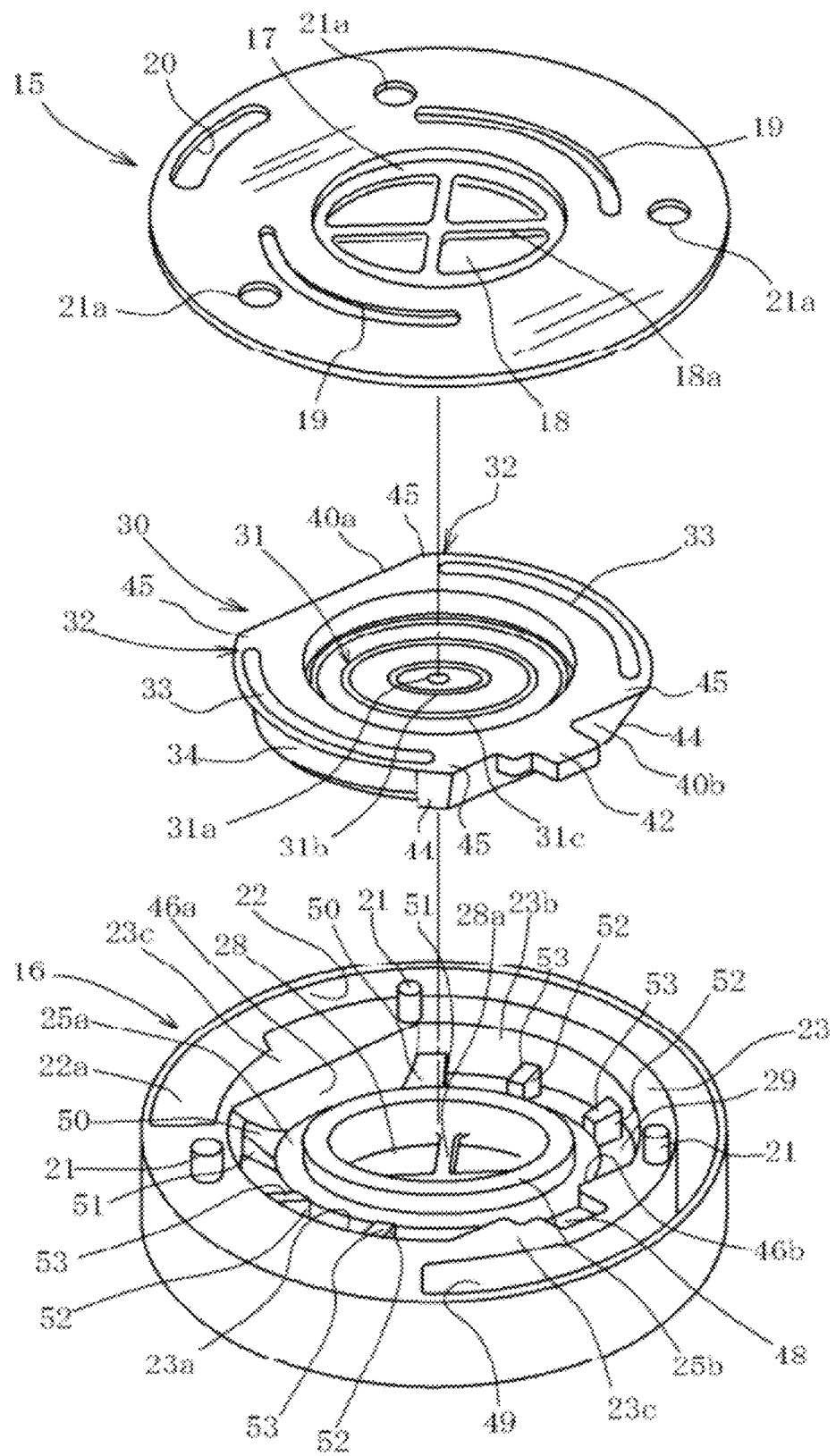
FIG. 8 is an exploded perspective view of a partition member.
Figure 9:
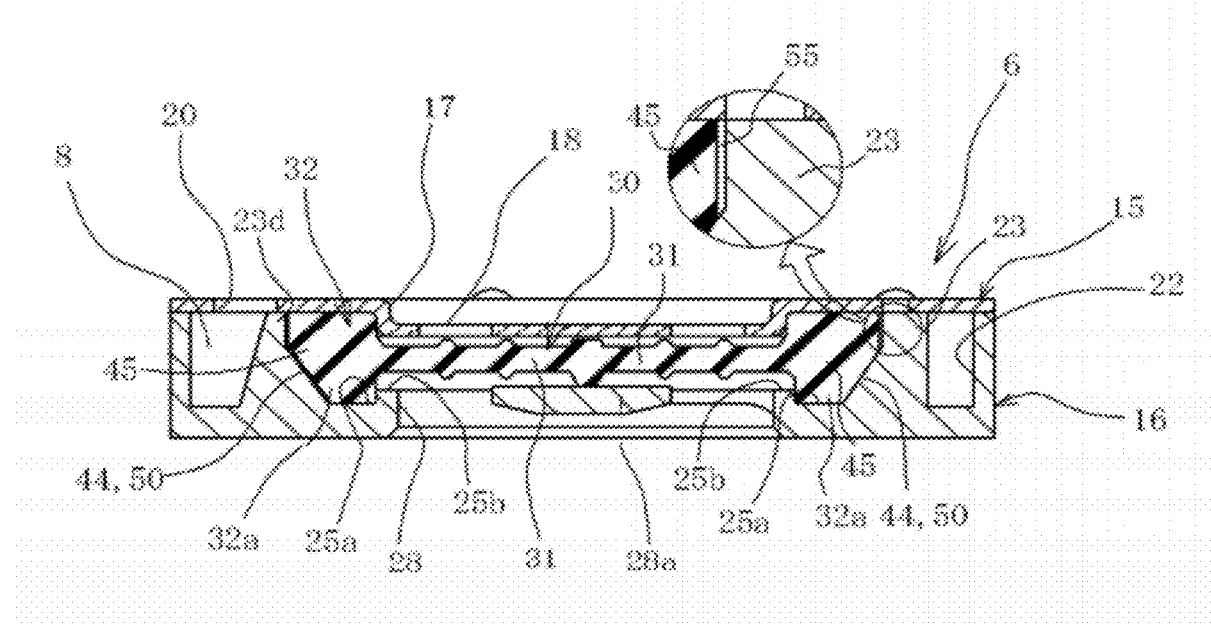
FIG. 9 is a cross sectional view of the partition member.
Figure 10:
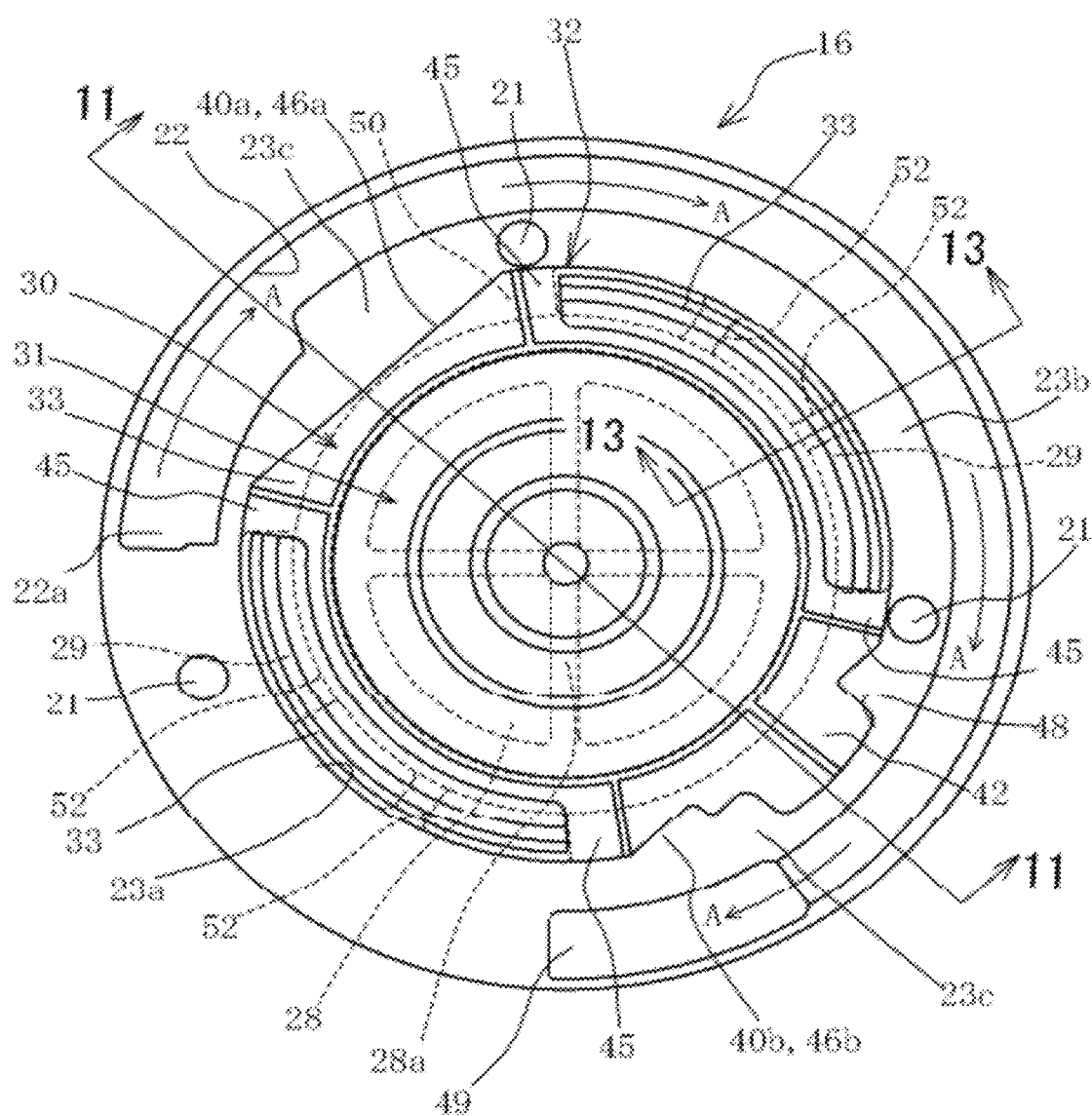
FIG. 10 is a plan view showing a state of fitting the elastic member into the frame member.
Figure 11:
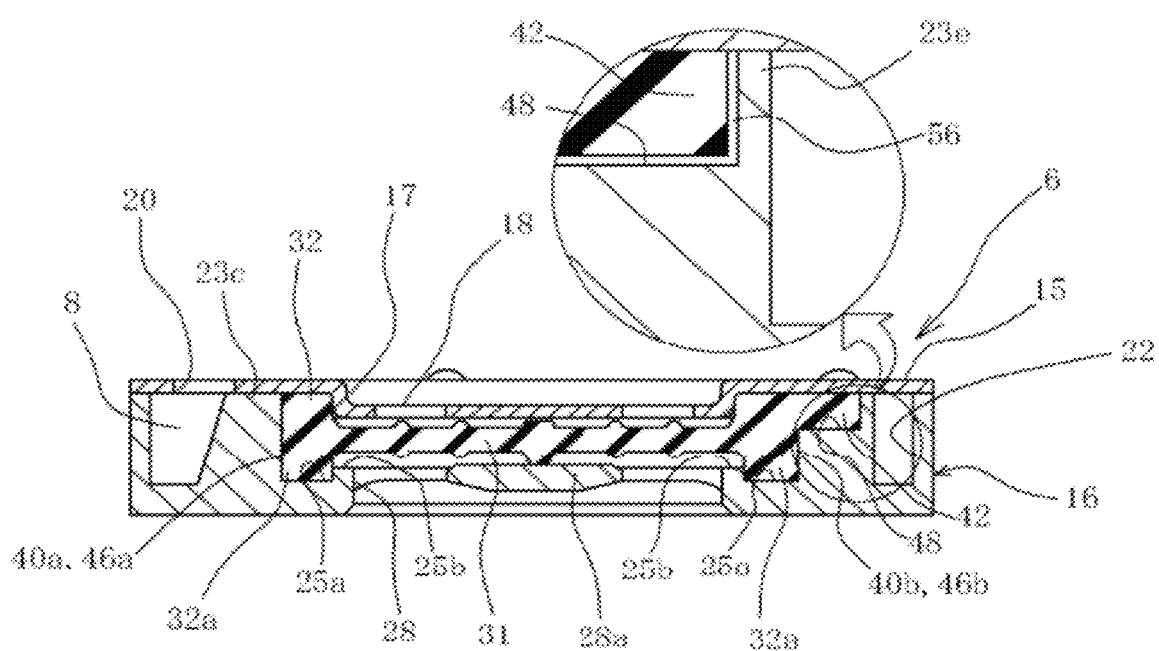
FIG. 11 is a cross sectional view taken along line 11-11 of FIG. 10.
Figure 12A:
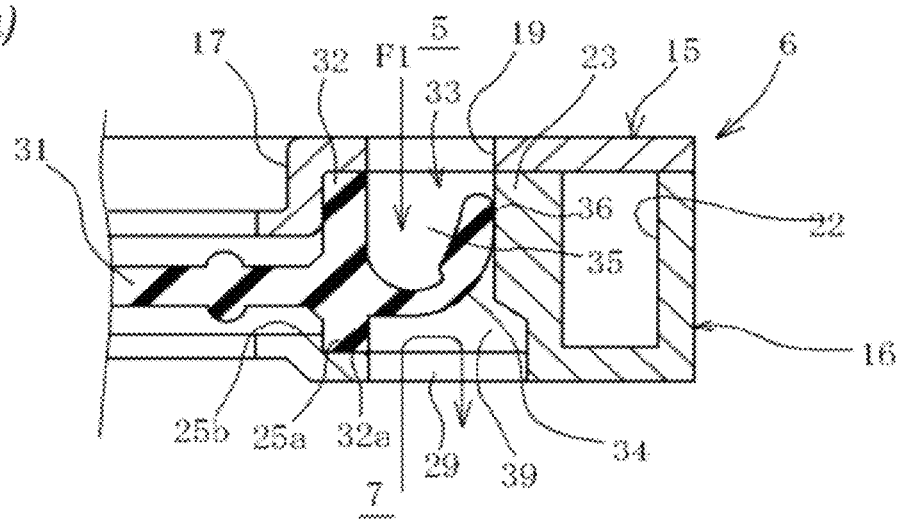
FIG. 12(a) is a cross sectional view of a relief valve when the great force is inputted in the closed condition.
Figure 12B:
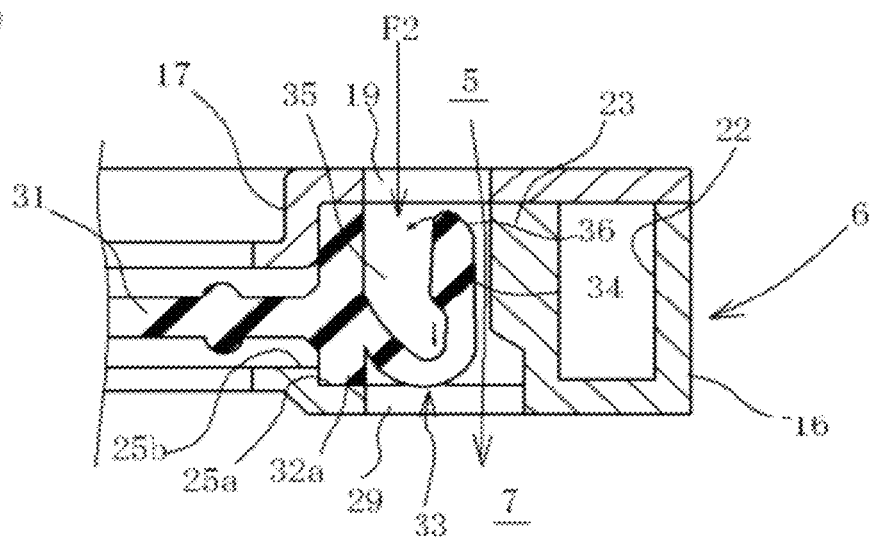
FIG. 12(b) is a cross sectional view of the relief valve when a slant wall is excessively deformed.
Figure 12C:
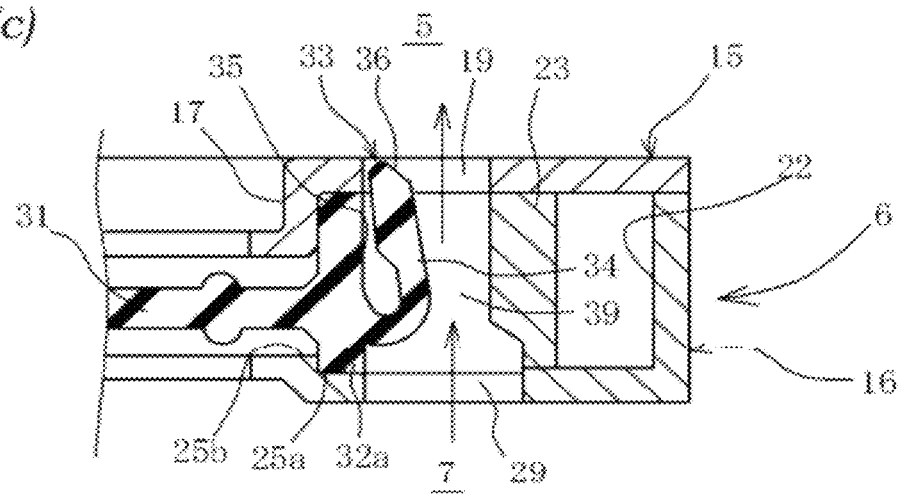
FIG. 12(c) is a cross sectional view of the relief valve when the direction of the vibration is reversed after the great force is inputted.
Figure 13:
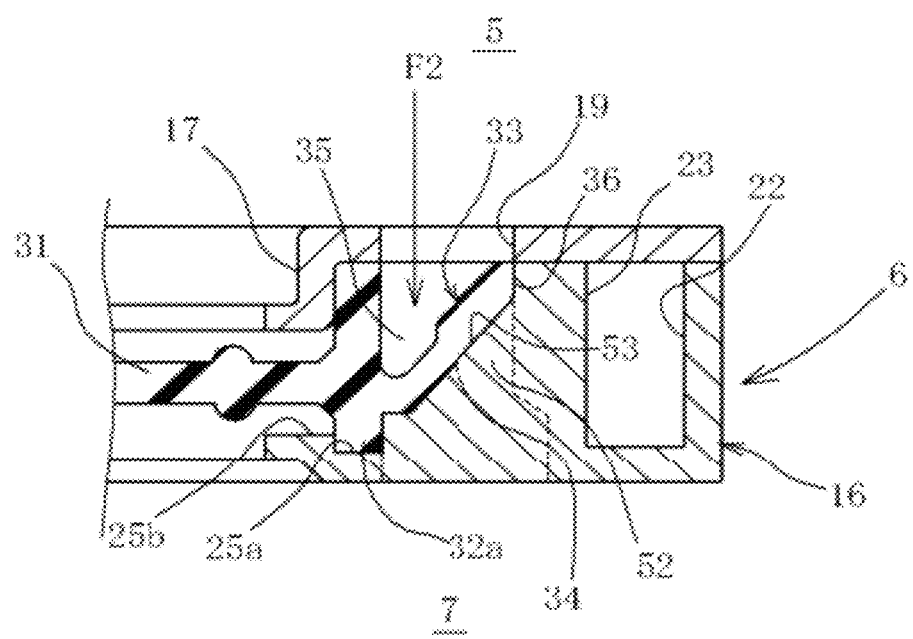
FIG. 13 is a cross sectional view taken along line 13-13 of FIG. 10.

FIG. 2 is a plan view of a frame member 16. FIG. 3 is a cross sectional view taken along line 3-3 of FIG. 2. FIG. 4 is a plan view of an elastic body. FIG. 5 is a cross sectional view taken along line 5-5 of FIG. 4. FIG. 6 is a cross sectional view taken along line 6-6 of FIG. 4. FIG. 7 is a cross sectional view taken along line 7-7 of FIG. 4. FIG. 8 is an exploded perspective view of the partition member. FIG. 9 is a cross sectional view of the partition member in an assembled state, which is shown in the same cross section as FIG. 1. FIG. 10 is a plan view showing a state of fitting the elastic member into the frame member without mounting a lid member. FIG. 11 is a cross sectional view taken along line 11-11 of FIG. 10. FIG. 12 and FIG. 13 are a cross sectional view in explaining the operation of a relief valve. Here, FIG. 13 shows a region corresponding to a cross section taken along line 13-13 of FIG. 10.

Firstly, the construction of the partition member 6 will be described mainly with reference to FIG. 8. The partition member 6 is comprised of three elements in such a state that the elastic body 30 is held in a central position by the lid member 15 and the frame member 16 which are separated upward and downward. The lid member 15 has a central upper opening 18 in its central position and a pair of right and left circular arc shaped relief apertures 19 on an outer circumferential side of the central upper opening A reference character 20 designates an inlet and outlet opening of an orifice passage.

A circular arc shaped groove 22 which forms the orifice passage 8 (FIG. 1) is provided in a radially outward position of the frame member 16 in a circular arc shape along the outer circumference. The length of the circular arc shaped groove 22 is about ¾ (three quarters) of the full circumference. By the way, the direction indicated by arrows A in FIG. 2 is the direction in which the hydraulic liquid flows through the circular arc shaped groove 22 from the primary liquid chamber 5 to the secondary liquid chamber 7.

The circular arc shaped groove 22 is partitioned from an inner circumferential region of the frame member 16 with an annular partition wall 23 which forms an inner circumferential wall of the circular arc shaped groove 22. The inside of the annular partition wall 23 defines a fitting space to which the elastic body 30 is fitted. In the bottom center region of the fitting space there is provided a central lower opening 28 on the outer circumferential side of which a pair of right and left circular arc shaped relief apertures 29 is provided.

The elastic body 30 has a thin-walled movable diaphragm section 31 in a central region thereof and a thick-walled outer circumferential section 32 which is thicker than the movable diaphragm section 31, in the outer circumferential region thereof surrounding the movable diaphragm section 31. On this thick-walled outer circumferential section 32 is formed a relief valve 33 in the shape of substantially V-shaped groove. The relief valve 33 is formed in the shape of circular arc and extends long (about ¼ of the full circumference) in the circumferential direction. The relief valve 33 is comprised of only a pair of relief valves which is arranged in an opposite position to each other across the center of the elastic body 30 at intervals of 180°.

When fitting the elastic body 30 into the fitting space of the frame member 16 and putting the lid member 15 thereon, the central upper opening 18 and the central lower opening 28 are located above and below the movable diaphragm section 31 (see FIGS. 9 and 11), the relief apertures 19 and 29 are located above and below the relief valve 33 (see FIG. 7), and the inlet and outlet opening 20 on the primary liquid chamber side faces one end in the longitudinal direction of the circular arc shaped groove 22 (see FIG. 9).

As shown in FIG. 7, between the annular partition wall 23 and the elastic body 30 (the relief valve 33) there is formed a relief passage 39 which communicates with the relief apertures 19 and 29. The relief valve 33 is allowed to open and close this relief passage 39 such that it closes the relief passage 39 at the time of a normal condition and opens the same only when the primary liquid chamber 5 reaches the predetermined negative pressure at the time of the great force input, thereby to relieve the hydraulic liquid from the secondary liquid chamber 7 to the primary liquid chamber 5. By the way, an inlet and outlet opening 49 on the secondary liquid chamber side which is provided on the frame member 16 faces the other end in the longitudinal direction of the circular arc shaped groove 22 (see FIG. 2).

Next, component elements of the partition member will be described in detail hereunder.

Firstly, the lid member 15 will be described with reference to FIG. 8, FIG. 9, etc. The lid member 15 has a circular shape in a plan view and is a substantially circular disc member made of proper materials such as a light metal, a hard resin and the like which have rigidity.

In a central region of the lid member 15 there is formed a one-step lowering central step 17 in which the central upper opening 18 communicating with the primary liquid chamber 5 is provided. The central upper opening 18 is partitioned by a cross-shaped deformation restriction frame 18a. The deformation restriction frame 18a restricts the excessive elastic deformation of the movable diaphragm section 31 by contacting and supporting an upper surface of the movable diaphragm section 31 at the time of the excessive deformation thereof. On the outer circumferential side of the central step 17, the pair of relief apertures 19 consisting of an oblong opening in the shape of a circular arc of about 90° has the length of about ¼ of the full circumference and is arranged in opposed relation across the center of the lid member 15 at intervals of 180° on the same circumference.

A reference character 20 designates the primary liquid chamber side inlet and outlet opening of the orifice passage 8 formed in the lid member 15. A reference character 21a designates a positioning hole with which a positioning pin is engaged as will be referred to later. Three positioning holes 21a are arranged for preventing the misassembling in irregular positions in the circumferential direction each of whose positions deviates from the positions of the relief aperture 19 and the primary liquid chamber side inlet and outlet opening 20.

Next, the frame member 16 will be described with reference to FIGS. 8, 2, 3 and 9-11. As shown in FIG. 8 and FIG. 2, the frame member 16 has a circular shape in a plan view and is formed of proper materials such as a light metal, a hard resin and the like which have rigidity. In the bottom center of the fitting space for the elastic body is formed the central lower opening 28 communicating with the secondary liquid chamber 7. A reference character 28a designates the deformation restricting frame which restricts the excessive elastic deformation of the movable diaphragm section 31 by contacting and supporting the lower surface of the movable diaphragm section 31 at the time of the excessive elastic deformation thereof.

An inner circumferential surface of the annular partition wall 23 is formed partially in a flat shape to form width across flat sections 46a, 46b. These width across flat sections 46a, 46b are comprised of straight lines corresponding to chords cutting in parallel the opposite portions of the circumference of an imaginary circle (shown by imaginary lines in FIG. 2) in which, in a plan view, circular sections 23a, 23b of the inner circumferential surface of the annular partition wall 23 are inscribed. Each of the width across flat sections 46a, 46b has substantially the same length as the chord which corresponds to a circular arc of about ¼ (a quarter) of the full circumference of the imaginary circle. Further, facing surfaces are vertical surfaces extending in parallel to the central axis. On the inner circumferential surface of the annular partition wall 23, the flat width across flat section and the circular section 23a, 23b are arranged alternately at intervals of about 90°. The circular sections 23a, 23b have the length of about ¼ (a quarter) of the imaginary circle. The circular sections 23a, 23b are located in opposed relation to each other and the width across flat sections 46a, 46b are located in opposed relation to each other.

On the bottom of the fitting space located on the inside of the annular partition wall 23, an annular bottom section 25a is formed at a predetermined space from each of the inner circumferential surfaces of the circular sections 23a, 23b of the annular partition wall 23. In the inner circumferential region of the annular bottom section 25a, there is formed an annular stopper section 25b in the shape of an annular partition wall having a low projecting height. The annular stopper section 25b borders on the central lower opening 28.

The annular bottom section 25a has a certain width in its full circumference. The relief aperture 29 is formed between the annular bottom section 25a and each of the inner circumferential surfaces of the circular sections 23a, 23b of the annular partition wall 23. Each of the flat surfaces of the width across flat sections 46a, 46b is in contact with or close to the outer circumference of the annular bottom section 25a, and when this contact point or closest point is "P", there are formed corner sections 51 which are enlarged toward both ends in the circumferential direction across this point "P". Since the corner section 51 is provided on both ends of each of the width across flat sections 46a, 46b, there are formed four corner sections in the full circumference. Although a shape of its plane surface is substantially a triangular or trapezoidal shape, a portion of the plane surface extends between each of the ends in the circumferential direction of the circular sections 23a, 23b and the annular bottom section 25a, so that, when this portion is included, the plane surface is substantially an irregular trapezoidal shape. A surface of each of the corner sections 51 is formed into a taper surface 50 and forms a slope slanting downward to the annular bottom section 25a (see FIG. 3).

By forming the width across flat sections 46a, 46b, the width in the radial direction of the annular partition wall 23 changes, and an upper surface interposed between each of the width across flat sections 46a, 46b and the circular arc shaped groove 22 forms an enlarged section 23c of a substantially crescent shape. The width in the radial direction of this enlarged section 23c is larger than the width in the radial direction of each upper surface of the circular sections 23a, 23c located between the circular arc shaped groove 22 and the relief aperture 29.

On the relief aperture 29 there are provided intermediate supports 52 each of which extends radially across the relief aperture 29 at an intermediate position in the longitudinal direction corresponding to the circumferential direction of the annular partition wall 23. The intermediate support 52 is formed in the shape of a rib which connects the outer circumferential portion of the annular bottom section 25a and the inner circumferential surface of the annular partition wall 23 so as to reinforce the peripheral portion of the relief aperture 29 because the relief aperture 29 extends comparatively long to about ¼ (a quarter) of the imaginary circle. At the same time, an upper end surface of the intermediate support 52 forms a taper wall 53 to support a slant wall 34 of the relief valve 33 on the lower side thereof (see FIG. 13). With this construction, there is prevented the sag of the relief valve 33 which is subject to sagging at the intermediate portion thereof due to comparatively long formation, and the excessive deformation of the relief valve 33 at the time of great force input as referred to later is also prevented.

As shown in FIGS. 2, 3, 8, etc., the intermediate supports 52 are integrally provided along the inner circumferential surface of the annular partition wall 23 while projecting at a predetermined height and extending in the direction of the center axis. The position and inclination of the taper wall 53 are properly determined in consideration of the shape of the slant wall 34 of the relief valve 33 and the conditions of the relief valves at the time of excessive deformation. In addition, although the number of the taper wall 53 is optional, two taper walls 53 are provided at regular intervals in the longitudinal direction of the relief valve 33.

As shown in FIG. 3, on the annular bottom section 25a, an annular concave portion is provided between the annular partition wall 23 and the annular stopper section 25b such as to fit the lower portion 32a of the thick-walled outer circumferential section 32 thereinto. The annular stopper section 25b allows the inner circumferential side of the lower portion 32a to be fixed in position such that when the thick-walled outer circumferential section 32 is pulled inward in the radial direction due to the elastic deformation of the movable diaphragm section 31, the lower portion 32a is not pulled out inward in the radial direction.

By the way, as shown in FIG. 9, etc., the upper portion of the thick-walled outer circumferential section 32 is fixed in position by the step 17 provided in the central region of the lid member 15 so as to prevent the inclination thereof in the radially inward direction, thereby contributing to improvement in accuracy of opening and closing the relief valve 33. The lower portion 32a is an arrester means which is fixed by being fitted to and positioned on the tapered annular partition wall and by being held between the lid member 15 and the frame member 16 on the upper and lower sides, and forms the annular support of the movable diaphragm section 31.

As shown in FIGS. 8, 2 and 11, on one of the opposed enlarged sections 23c there is formed a misassembling preventing groove 48 with which a misassembling preventing projection 42 (see FIG. 11) provided on the elastic body 30 is engaged.

A reference character 21 in FIG. 8 designates three positioning pins which projects from an upper surface of the annular partition wall 23. When the positioning pin 21 is inserted into the positioning hole 21a provided on the lid member 15 and thereafter has the forward end thereof caulked, the lid member 15 and the frame member 16 is fixed in position and united together so that the relative rotation between the lid member 15 and the frame member 16 becomes impossible.

Next, the elastic body will be described with reference to FIGS. 4-13. As shown in FIG. 4 and FIG. 8, the elastic body 30 is formed of proper materials rich in elasticity such as rubber or the like and has a shape and size capable of being fitted into the fitting space of the frame member 16. Namely, there is formed a pair of width across flat sections 40a, 40b corresponding to chords cutting in parallel the opposite portions of an imaginary circle (shown by imaginary lines in FIG. 4) in which an outer circumferential section having substantially the same diameter as the inner circumference of the annular partition wall 23 are inscribed. On the outer circumferential section 32 between the pair of width across flat sections 40a, 40b, the pair of relief valves 33 is arranged in opposition to each other.

Four corner sections 45 are provided in the boundary portions between each of the width across flat sections 40a, 40b and each of the relief valves 33 in the circumferential direction. The width across flat section 40a, 40b and the relief valve 33 are arranged alternately in the longitudinal direction. The length in the longitudinal direction of the relief valve 33 is about ¼ (a quarter) of the full circumference of the imaginary circle while the width across flat section 40a, 40b has the length of a chord corresponding to a circular arc of about ¼ (a quarter) of the imaginary circle. The corner sections 45 and the width across flat sections 40a, 40b form a detent section in the present invention.

Each of opposed surfaces of the width across flat sections 40a, 40b forms a vertical surface which extends in parallel to a center axis of the elastic body and, when being fitted into the frame member 16, is fitted to the width across flat sections 46a, 46b of the frame member 16 to form a detent means. The width across flat sections 40a, 40b and the corner sections 45 form the detent section in the present invention.

As apparent from FIG. 7, the outer circumferential lateral surface of the relief valve 33 forms the slant wall 34 an upper portion of which forms a seal portion 36 contacting the inner circumferential surface of the annular partition wall 23 to close the relief passage 39 when being fitted to the frame member 16.

As shown in FIGS. 3, 5, 8, etc., the corner section 45 is a section adapted to being fitted to the corner section 51 of the frame member 16 and the outer wall surface thereof forms a taper surface 44 which has an inclination, shape and size corresponding to the taper surface 50 of the corner section 51. The corner sections 51 and the width across flat sections 46a, 46b form the engaging or fitting section in the present invention.

As shown in FIG. 6, the corner section 45 is a thick wall portion to which the relief valve 33 is connected. When the relief valve 33 is pulled toward the intermediate portion in the longitudinal direction thereof by receiving the hydraulic pressure of the primary liquid chamber 5, the corner section 45 forms a support portion for fixedly supporting the end in the longitudinal direction of the relief valve 33 so as not to be inclined toward the pulled direction.

By the way, since the thick-walled width across flat sections 46a, 46b including the corner sections 45 connect each of the ends in the longitudinal direction of the pair of relief valves 33 whereby the entire portion located between the pair of relief valves 33 supports each of the ends in the longitudinal direction of the relief valves 33 with the thick-walled construction of enough length corresponding to about ¼ (a quarter) of the outer circumference, the rigidity for supporting the relief valves 33 can be increased enough and the reliable detent function can be performed.

Then, as shown in FIG. 10, when the elastic body 30 is fitted to the frame member 16, the taper surfaces 44 and 50 of the corner sections 45 and 51 in four corners are taper joined together to properly position the elastic body 30 thereby to fix the relief valves 33 in accurate positions.

Thus, when assembling, the partition member 6 is allowed to be easily assembled by the taper joining, and the elastic body 30 is properly positioned relative to the frame member 16 so as to maintain the relief passage 29 in a predetermined state. Moreover, in the case of the subsequent uses, the relief passage 29 is kept constant by the accurate detent. Therefore, in such a condition that the cavitation phenomenon occurs upon great force inputting, the predetermined amount of the relief flow is obtained so that the occurrence of the cavitation phenomenon can be steadily prevented.

By the way, the direction indicated by arrows A in FIG. 10 is the direction in which the hydraulic liquid flows through the circular arc shaped groove 22 from the primary liquid chamber 5 to the secondary liquid chamber 7. The swirling flow of the hydraulic liquid is caused in this direction on the surface side of the partition member 6 located within the primary liquid chamber 5 so that the force allowing the elastic body 30 to be rotated is caused.

Further, by taper joining the taper surfaces 44 and 50 of each of the corner sections 45 and 51, the sealing performance of each of the corner sections is able to be increased. When the great force is applied to the outer circumferential section of the elastic body upon great force inputting, the high liquid sealed state is maintained between the outer circumferential section of the elastic body and the frame member in the taper joining area between both of the corner sections 45 and 51 so as to prevent a liquid leak from this area, thereby making it possible to prevent the decrease in damping force.

In addition, since the high sealing performance in the taper joining area is obtained, the liquid leak at the corner sections 45 adjacent to the relief valves 33 subject to receiving the elastically deforming force can be prevented by being taper joined with the corner sections 51.

As shown in enlarged scale in FIG. 9, in consideration of workability at the time of assembling, there is provided a slight gap 55 between the upper portion of the inner wall surface of the corner section 51 and the upper portion of the outer wall surface of the corner section 45 in the state of fitting the elastic body 30 to the frame member 16. In the neighborhood of the gap 55, there is formed an enlarged portion 22a (FIG. 2) at the end of the circular arc shaped groove 22, whereby the annular partition wall 23 in the vicinity thereof is formed as a thin-walled section 23d. The area neighboring such thin-walled section 23d in which there is possibility of liquid leaking through the gap 55 from the joining region between the corner sections 45 and 51, from the primary liquid chamber 5 to the secondary liquid chamber 7 is allowed to be prevented from the liquid leak by the high sealing performance of the taper joining area between the corner sections 45 and 51.

Further, as shown in FIG. 11, also on the side of the width across flat section 46b provided with the misassembling preventing groove 48 and the misassembling preventing projection 42, the positioning and the high sealing performance by the corner section 45 is similarly realized. Then, as shown in the enlarged illustration of the drawing, while a slight gap 56 is provided between the misassembling preventing groove 48 and the misassembling preventing projection 42, the liquid leak from this gap 56 is also prevented. In this drawing, the upper portion of the annular diaphragm section 23 on which the misassembling preventing groove 48 is provided is formed as a thin-walled section 23e.

Furthermore, in order to prevent such liquid leak, a plurality of seal means 57a-57d are formed on the surface of the elastic body 30, as shown in FIG. 4.

As shown in FIG. 8 and FIG. 9, on the upper surface and the lower surface of the movable diaphragm section 31 of the elastic body 30 a plurality of concentric ring shaped ribs 31a, 31b, 31c are integrally provided in a projecting fashion. When being elastically deformed, the movable diaphragm section 31 initially comes into contact with the upper and lower deformation restriction frames 18a, 18b at a small contact area.

As shown in FIGS. 8, 9 and 11, when the elastic body is fitted into the fitting space of the frame member 16 while the misassembling preventing projection 42 is engaged with the misassembling preventing groove 48, the elastic body 30 is able to be fixed in position while being prevented from misassembling in such a manner that the width across flat sections 40a, 40b contact accurately and are engaged with the corresponding width across flat sections 46a, 46b. Then, after each of the positioning pins 21 is inserted into the positioning hole 21a of the lid member 15 to be fixed in position, the tip end of each of the positioning pins 21 is caulked while pressing the lid member 15 on the elastic body 30 at the predetermined pressure, so that the partition member 6 is united and assembled and a high sealing performance is obtained by taper joining the taper surfaces 44 and 50 mutually. Moreover, since the elastic body 30 is accurately fixed in position, each of the relief apertures 19 and 29 and each of the relief valves 33 can be reliably and easily aligned.

Further, as shown in FIG. 10, each of the flat outer lateral surfaces of the width across flat sections 46*a*, 46*b* forming the high rigid support contacts at a large area each of the flat width across flat sections 46*a*, 46*b* formed on the inner circumferential wall of the annular partition wall 23. Therefore, in the case of where the great force is inputted, the rotation of the elastic body 30 can be assuredly prevented by the width across flat sections 40*a*, 40*b* of the outer circumferential section thereof.

Next, the relief valve will be described with reference to FIGS. 6-8, 10, 12 and 13.

As shown in FIGS. 6 and 7, the relief valve 33 has a concave portion 35 which is integrally formed with a portion of the thick-walled outer circumferential section 32. A radially outward wall portion surrounding the concave portion 35 forms a slant wall 34 which extends obliquely upward from the side of the secondary liquid chamber 7 to the side of the primary liquid chamber 5 so as to be opened outward. The distal end portion of this slant wall 34 forms a thick-walled seal portion 36 the outer surface side of which fluid tightly contacts the inner circumferential surface of the annular partition wall 23.

The slant wall 34 is a main component of the relief valve 33. As shown in FIG. 7, the slant wall 34 is hardly bent in the normal condition thereof and it is located to cover the upward portion of the relief passage 39 to close the relief passage 39 whereby the hydraulic liquid easily flows through the relief passage 39 from the secondary liquid chamber 7 to the primary liquid chamber 5. On the side of the primary liquid chamber 5, there is formed the concave portion 35 of substantially V-shaped cross section which is opened toward the primary liquid chamber 5.

FIGS. 12(*a*), 12(*b*) and 12(*c*) are views in explaining the operation of the relief valve 33, wherein FIG. 12(*a*) shows the state that the great force is inputted in the closed condition of the relief valve 33. In this state, the slant wall 34 is bent and swelled large downward thereby to receive the hydraulic pressure (F1) by the great force input. Then, the seal portion 36 slides on the inner circumferential surface of the annular partition wall 23 to maintain contact therewith so as not to relieve the hydraulic liquid from the lower secondary liquid chamber 7 to the primary liquid chamber 5.

FIG. 12(*b*) shows the state that the slant wall 34 is excessively deformed by the still larger hydraulic pressure to allow a portion of the seal portion 36 to be separated from the annular partition wall 23 due to the irregular deformation and the sealing performance is lost to have the hydraulic liquid leaked out. In this state, due to the leak of the hydraulic liquid, the amount of the hydraulic liquid to be supplied from the secondary liquid chamber 7 to the primary liquid chamber 5 through the orifice passage 8 is reduced thereby to allow the damping force to be decreased. In addition, in the case where the liquid leak is not caused, when the slant wall 34 is excessively deformed, it absorbs the more hydraulic pressure than required thereby causing the decrease in damping force. According to the present invention such excessive deformation can be prevented by the intermediate support 52, as described hereunder.

FIG. 12(*c*) shows the state that after the great force is inputted the direction of vibration is reversed and the volume of the primary liquid chamber 5 turns to the tendency toward an increase thereby to allow the primary liquid chamber 5 to turn to a negative pressure. At this stage, the slant wall 34 is drawn in suction toward the primary liquid chamber 5 and at the same time the hydraulic liquid on the side of the secondary liquid chamber 7 pushes the slant wall 34 upward. Therefore, the slant wall 34 is such deformed from the distal end thereof as to be peeled off, and soon the seal portion 36 is separated from the inner circumferential surface of the annular partition wall 23 to be opened. Then, the hydraulic liquid flows from the secondary liquid chamber 7 to the primary liquid chamber 5 via the relief aperture 29, the relief passage 39 and the relief aperture 19 to increase the hydraulic pressure of the primary liquid chamber 5 so that the occurrence of the cavitation phenomenon can be prevented.

At this time, since the distal end side of the slant wall 34 is inclined toward the primary liquid chamber 5, the hydraulic liquid is guided along this slant wall 34 and concentratedly operates on the seal portion 36. Therefore, when the primary liquid chamber 5 turns to the predetermined negative pressure, the relief valve 33 is smoothly opened.

FIG. 13 is a view in explaining the operation of the intermediate support 52 and shows the state that the excessive hydraulic pressure F2 operates due to the excessive force input in a similar manner to FIG. 12(*b*). In this state, according to the present invention, the taper wall 53 of the intermediate support 52 supports the lower portion of the slant wall 34 at the intermediate position in the longitudinal direction of the relief valve 33. Thus, by supporting the intermediate portion in the longitudinal direction subject to largest deformation, the excessive deformation of the slant wall 34 is allowed to be prevented. Therefore, the leak due to the excessive deformation can be prevented and the decrease of the damping force can be prevented.

Moreover, in the case where in order to obtain a large relief amount, the opening areas of the relief apertures 19, 29 are increased and the relief valves 33 extend long, the excessive deformation also can be reliably and easily prevented. Similarly, the decrease in damping force can be prevented for the reason that unnecessary hydraulic pressure absorption due to the excessive deformation is not caused.

Further, since the length of the relief valve 33 is about ¼ (a quarter) in length of the circumferential length of the imaginary circle extending along the circumferential direction of the relief valve 33, the flow amount of the hydraulic liquid at the time of relief is increased so that the occurrence of the cavitation phenomenon can be effectively prevented. Moreover, only a pair suffices for the relief valve 33 and it is not required to provide four relief valves as seen in the past. Thus, the number of the relief valve 33 can be reduced by half, and the volume of the thick-walled outer circumferential section 32 serving as the fixing section at each end in the longitudinal direction of the relief valve 33 is enlarged thereby to make it possible to increase the supporting rigidity and to prevent the liquid leak.

Besides the above, while the portion of the relief valve 33 which is hardest to bend is the connecting portion to the corner section 45 at each end in the longitudinal of the relief valve, the number of such portion can be reduced by half by reducing the number of the relief valve 33 by half, so that the operability of the relief valve 33 can be relatively improved.

The present invention is not limited to the above embodiment but may be variously embodied. For example, the detent section may be formed by forming the outer circumference of the thick-walled outer circumferential section 32 between the right and left relief valves 33 into a noncircular polygonal shape without a width across flat shape so as to perform the detent function. Also, the taper-shaped portion may be provided on the detent section and the corresponding fitting section of the frame member side at least in part or in whole.

Figure 14:
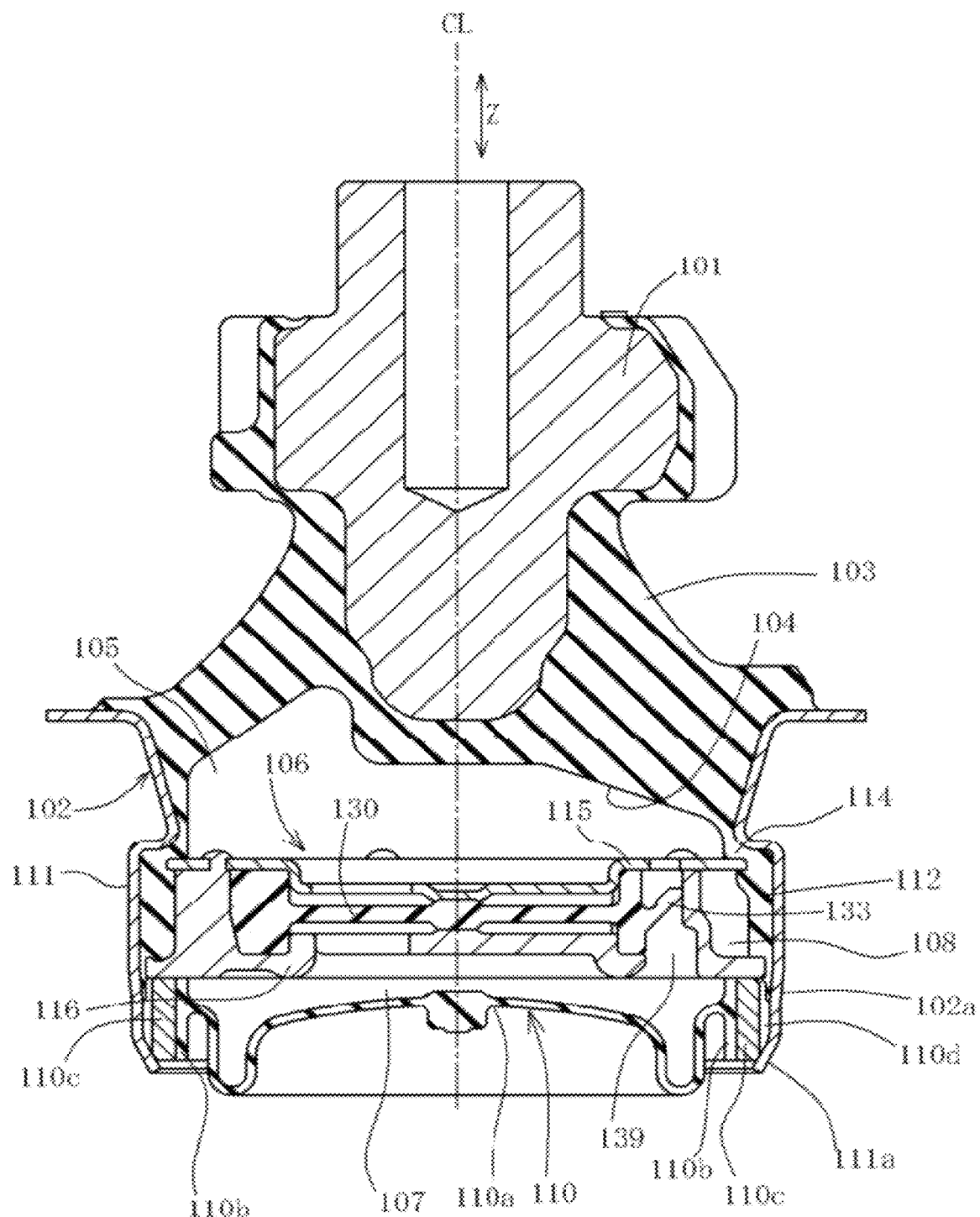
FIG. 14 is a cross sectional view of the liquid sealed vibration isolating device according to a second embodiment of the present invention.

FIG. 14 is a cross sectional view taken on a central axis CL (corresponding to a cross section taken along line 14-14 of FIG. 15) of the liquid sealed vibration isolating device in accordance with a second embodiment of the present invention. The central axis CL also corresponds to a center line of an elastic body 130 as referred to later.

This engine mount comprises a first mounting member 101 mounted on the side of an engine (not shown) as a vibration source, a second mounting member 102 mounted on a vehicle body (not shown) as a vibration receiving side, and an insulator 103 adapted to connect the first and second mounting members. The insulator 103 is formed of a publicly known vibration isolating elastic member such as rubber or the like and is an elastic body which is a main vibration isolating means against vibration. The vibration inputted to the first mounting member 101 in the inputting direction Z of the main vibration is absorbed firstly by the elastic deformation of the insulator 103. The main vibration inputting direction Z runs parallel to the center line CL as shown in the drawing. By the way, in the description hereunder the illustration viewed from an upper side of the drawing in the direction Z will be described as a plan view.

The insulator 103 is formed substantially in the shape of a frustum of a cone in cross section and provided with a dome-shaped portion 104 on the inside thereof. A concave portion which is opened downward in FIG. 14 is formed by the dome-shaped portion 104. Into this concave portion an incompressible hydraulic liquid is filled thereby to form a primary liquid chamber 105.

The primary liquid chamber 105 is partitioned from a secondary liquid chamber 107 by a partition member 106 and communicates through an orifice passage 108 with the secondary liquid chamber 107 while being spaced apart from the latter by the partition member 106. The secondary liquid chamber 107 is formed between a diaphragm section 110 and the partition member 106 and uses the diaphragm section 10 as a portion of its wall.

The partition member 106 has the orifice passage 108, a movable diaphragm section (described later) for absorbing the hydraulic pressure fluctuation of the primary liquid chamber 105, and a relief valve (described later) for relieving the hydraulic liquid from the secondary liquid chamber 107 to the primary liquid chamber 105 at the time of great force input. The orifice passage 108 serves as a damping orifice which is set such as to resonate with the vibration of low frequency like a shake vibration, etc. of about 10~11 Hz, for example.

The second mounting member 102 is provided with a cylindrical metal fitting 111. This outer cylindrical metal fitting 111 is fitted into a holder (not shown) or mounted through a bracket on the vehicle body, depending on the situation. The outer cylindrical fitting 111 forms a part of the second mounting member 102. It also forms an outer circumferential wall of the orifice passage 108 together with an extending portion 112 of the insulator 103 which is integrally united with an inside of the outer cylindrical fitting.

The extending portion 112 of the insulator 103 extends downward to substantially the same level as the height of the partition member 106 thereby to integrally cover an inner wall of the outer metal fitting 111. The extending portion 112 covers the outer circumferential portion of the partition member 106 and performs a seal between the orifice passage 108 and the outer cylindrical metal fitting 111.

On an upper portion of the extending portion 112 facing the primary liquid chamber 105 is formed a thick-walled step portion 114 by which the outer circumferential portion of the partition member 106 is fixed in position.

The diaphragm section 110 has a thin wall portion 110a as a main body and a thick-walled outer circumferential portion 110b which is integrally formed with an outer circumferential portion of the thin wall portion. A fixing ring 110c is inserted into and united with the outer circumferential portion 110b. A seal portion 110d which forms a portion of the outer circumferential portion 110b protrudes radially outward from an outer circumferential surface of the fixing ring 110c. The fixing ring 110c is inserted through the seal portion 111d into the inside of the outer cylindrical metal fitting 111 and fastened thereto by caulking.

Figure 15:
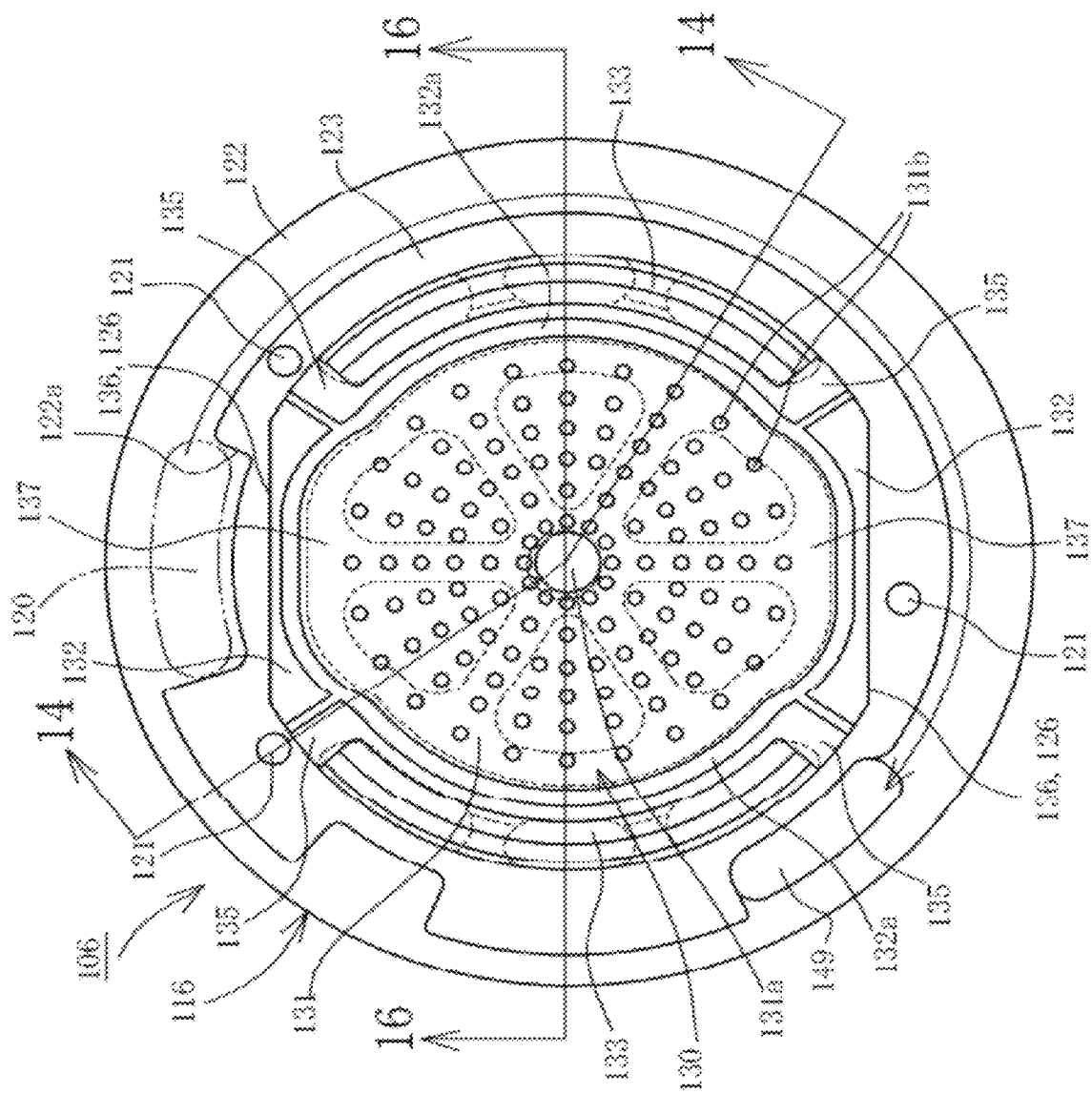
FIG. 15 is a plan view according to the second embodiment from which a frame member is partially omitted.
Figure 16:
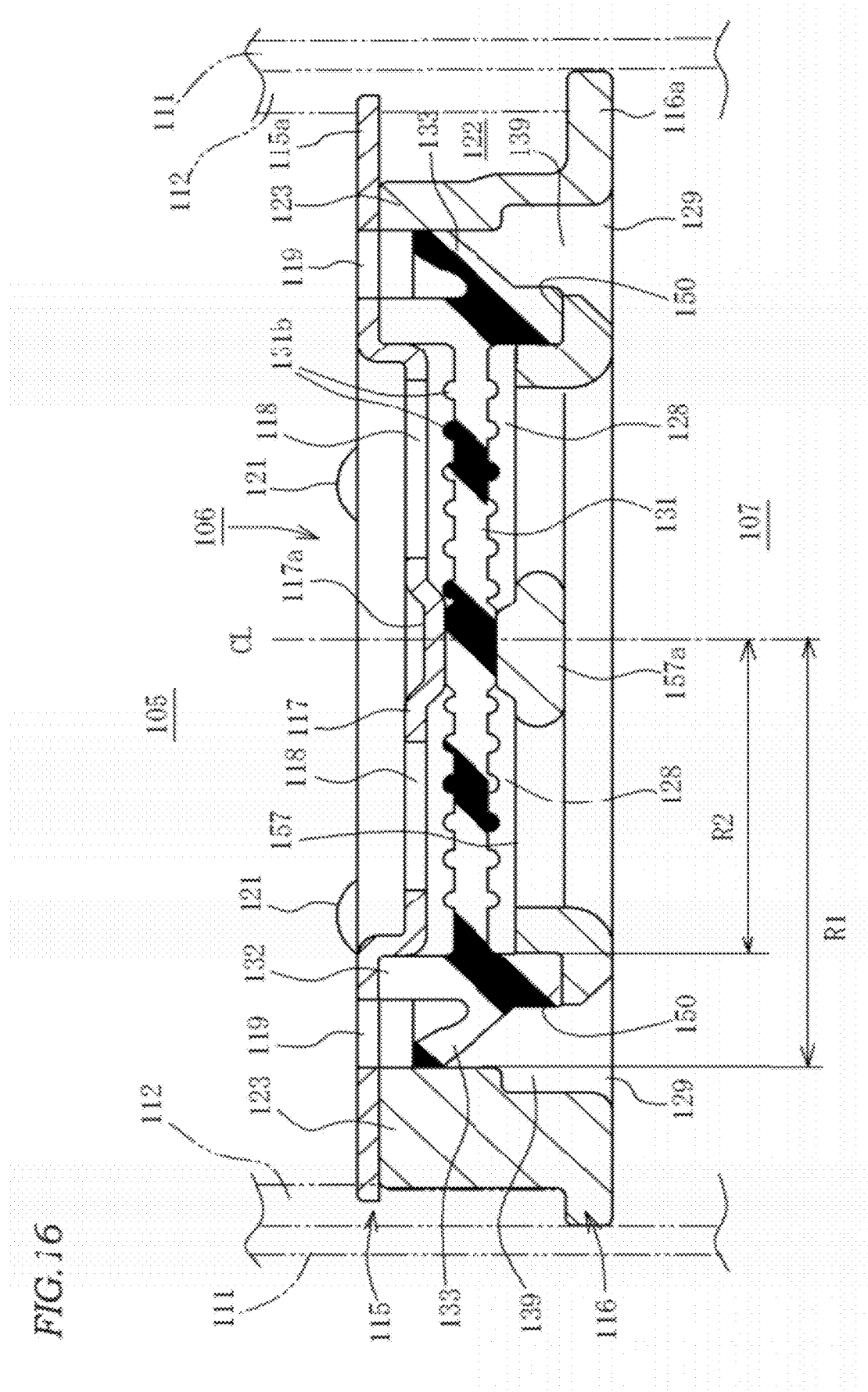
FIG. 16 is a cross sectional view taken along line 16-16 of FIG. 15.
Figure 17:
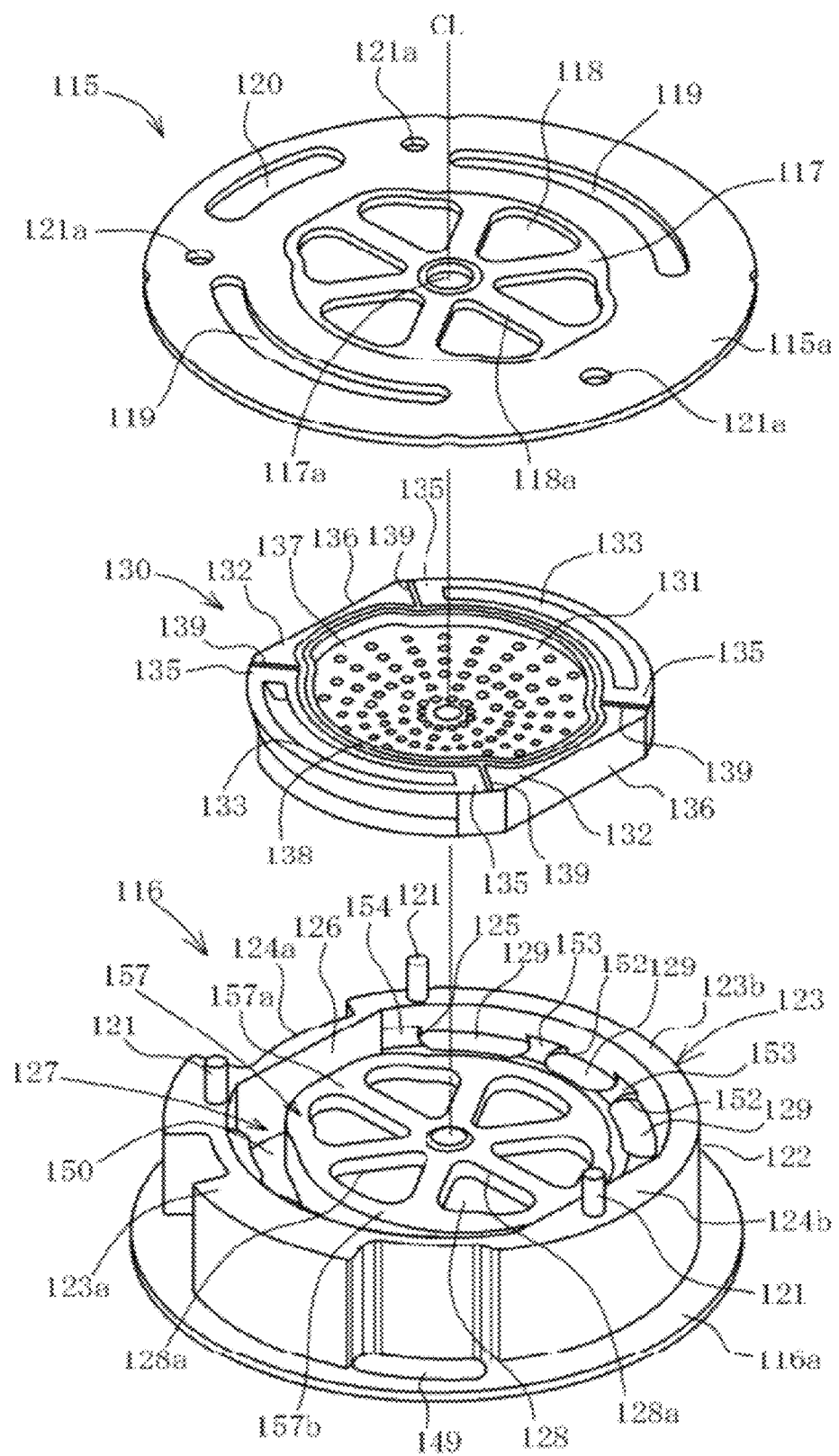
FIG. 17 is an exploded perspective view of a partition member.

Next, the partition member 106 will be described in detail hereunder. FIG. 15 is a plan view of the partition member in the state of removing an upper frame member. FIG. 16 is a cross sectional view taken along line 16-16 of FIG. 15 (the upper frame member being also shown in the same cross section). FIG. 17 is a perspective view of the partition member in the state of disassembling it into each of component elements. Firstly, the construction of the partition member 106 will be described mainly with reference to FIG. 17. The partition member 106 is comprised of three elements in such a state that the elastic body 130 is held in a central position by the upper frame member 115 and a lower frame member 116 which are separated upward and downward.

The upper frame member 115 serving as a lid member for the lower frame member 116 has a central upper opening 118 in its central position and a pair of right and left circular arc shaped relief apertures 119 on an outer circumferential side of the central upper opening. A reference character 120 designates an opening of an orifice passage on the side of the primary liquid chamber. A reference character 121a designates a positioning hole in which a positioning pin 121 of the lower frame member 116 is engaged.

On the radially outward side of the lower frame member 116, a concave section 122 which forms the orifice passage 108 (FIG. 14) is formed in a circular arc shape along the outer circumference. The length of the concave section 122 is about ¾ (three quarters) of the full circumference. By the way, the direction indicated by an arrow A in FIG. 15 is the direction in which the hydraulic liquid flows along the concave section 122 from the primary liquid chamber 105 to the secondary liquid chamber 107.

The concave section 122 is partitioned from an inner circumferential region of the lower frame member 116 with an annular partition wall 123 which forms an inner circumferential wall of the concave section 122. The inside of the annular partition wall 123 defines a fitting space 127 to which the elastic body 130 is fitted. In the bottom center region of the fitting space 127 there is provided a central lower opening 128 on the outer circumferential side of which a pair of right and left circular arc shaped relief apertures 129 is provided.

The elastic body 130 has a thin-walled movable diaphragm section 131 in a central region thereof and a thick-walled outer circumferential section 132 which is thicker than the movable diaphragm section 131, in the outer circumferential region thereof surrounding the movable diaphragm section 131. On this thick-walled outer circumferential section 132 is formed a relief valve 133 in the shape of substantially V-shaped groove. The relief valve 133 is formed in the shape of circular arc and extends long to about ⅓ (a third) of the full circumference at a divergent angle of about 120°) in the circumferential direction. The relief valve 133 is comprised of a pair of relief valves which is arranged in an opposite position to each other across the center of the elastic body 130 at intervals of 180°. Different from the prior art that two pairs of relief valves are oppositely provided, only a pair of relief valves is provided for the relief valve 133.

When fitting the elastic body 130 into the fitting space 127 of the lower frame member 116 and putting the upper frame member 115 thereon, the central upper opening 118 and the central lower opening 128 are located above and below the movable diaphragm section 131 (see FIGS. 16 and 17), the relief apertures 119 and 129 are located above and below the relief valve 133 (see FIGS. 16 and 17), and the opening 120 on the primary liquid chamber side faces an enlarged end 122a which is formed in one end in the longitudinal direction of the concave section 122 (see FIG. 15). At this time, the lower portion of the thick-walled outer circumferential section 132 is an arrester means which is fixed by being fitted in and positioned on an annular groove 150 of the lower frame member 116 and by being held between the upper frame member 115 and the lower frame member 116 on the upper and lower sides, and forms the annular support of the movable diaphragm section 131.

As shown in FIG. 16, between the annular partition wall 123 and the elastic body 130 (the relief valve 133) there is formed a relief passage 139 which communicates between the relief apertures 119 and 129. The relief valve 133 is allowed to open and close this relief passage 139 such that it closes the relief passage 139 at the time of a normal condition and opens the same only when the primary liquid chamber 105 reaches the predetermined negative pressure at the time of the great force input, thereby to relieve the hydraulic liquid from the secondary liquid chamber 107 to the primary liquid chamber 105. By the way, an opening 149 (see FIG. 15) on the secondary liquid chamber side which is located on the lower frame member 116 faces the other end in the longitudinal direction of the concave section 122.

Further, the inner and lower sides of the concave section 122 are surrounded with the annular partition wall 123 and a flange 116a which projects radially outward from a lower end of the annular partition wall 123. An upper side of the concave section 122 is surrounded with an outer circumferential extension 115a (a portion extending radially outward from the annular partition wall 123) of the upper frame member 115 while an outer lateral side thereof is opened. This opened portion is covered, when assembling all, with the outer cylindrical metal fitting 111 and the extending portion 112 on the inside of the metal fitting so as to form the orifice passage 108. A lower end of the extending portion 112 abuts on the flange 116a, and the abutting portion is sealed by squeezing a seal projection integrally formed in advance on the lower end of the extending portion 112.

The outer circumferential extension 115a of the upper frame member 115 abuts on an intermediate portion in an upward and downward direction of the extending portion 112. The outer circumferential extension 115a is smaller in diameter than the flange 116a by a thickness of the extending portion 112.

When constructed as above, the outer circumferential wall of the orifice passage 108 is formed with the lower frame member 116, the extending portion 112 and the outer cylindrical metal fitting 111. Thus, since the extending portion 112 and the outer cylindrical metal fitting 111 are able to be used for component elements of the orifice passage 108, the orifice passage 108 can be arranged closer to the outer circumferential side by not providing the outer wall of the orifice passage 108 on the lower frame member 116.

Figure 18:
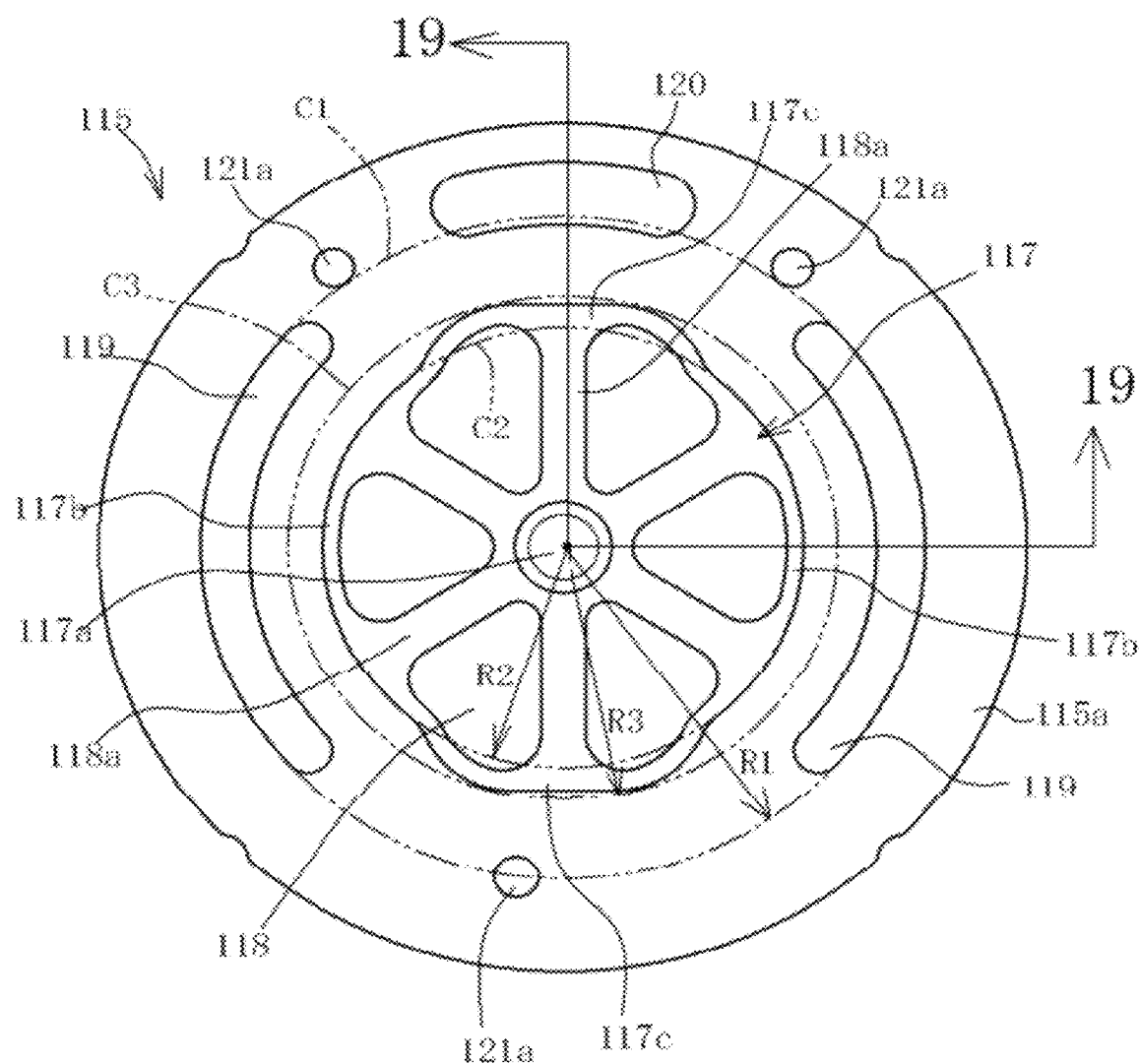
FIG. 18 is a plan view of an upper frame member.
Figure 19:
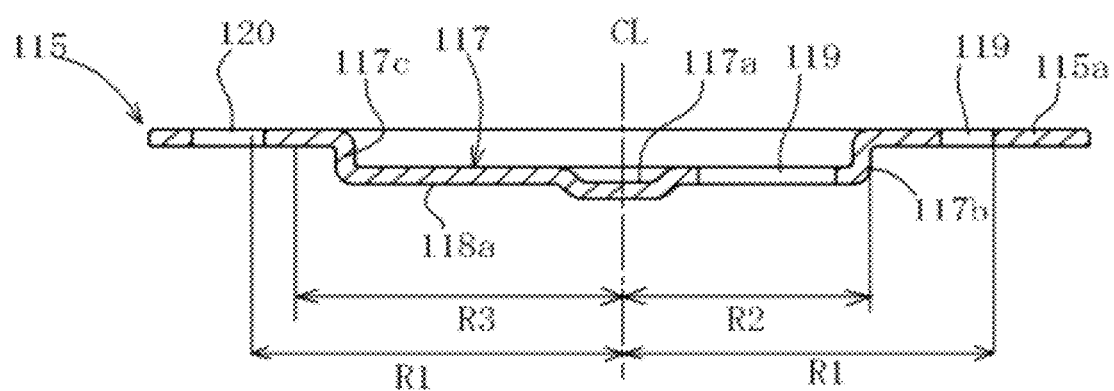
FIG. 19 is a cross sectional view taken along line 19-19 of FIG. 18.

Component elements of the partition member will be described in detail hereunder. Firstly, the upper frame member 115 will be described with reference to FIG. 18 and FIG. 19. FIG. 18 is a plan view of the upper frame member, and FIG. 19 is a cross sectional view taken along line 19-19 of FIG. 18. In these drawings, the upper frame member 115 has a circular shape in a plan view and is a substantially circular disc element made of proper materials such as a light metal, a hard resin and the like which have rigidity.

In a central region of the upper frame member 115 there is formed a one-step lowering noncircular central step 117 in which the central upper opening 118 communicating with the primary liquid chamber 105 is provided. The central upper opening 118 is partitioned by a plurality of radially extending deformation restriction frames 118a (a reference character being affixed only on the limited number thereof).

The deformation restriction frame 118a restricts the excessive elastic deformation of the movable diaphragm section 131 by contacting and supporting an upper surface of the movable diaphragm section 131 at the time of the excessive elastic deformation thereof. On the outer circumferential side of the central step 117, the pair of relief apertures 119 consisting of an oblong opening in the shape of a circular arc of about 90° has the length of about ⅓ (a third) of the full circumference and is arranged in an opposed relation across the center of the upper frame member 115 at intervals of 180° on the same circumference. In the center of the upper frame member 115 there is formed a central fixing convex portion 117a which protrudes downward.

A reference character 120 designates the primary liquid chamber side opening of the orifice passage 108 formed in the upper frame member 115. Three positioning holes 121a are arranged in irregular positions in the circumferential direction for preventing the misassembling each of whose positions deviates from the positions of the relief aperture 119 and the primary liquid chamber side opening 120.

A reference character C1 designates an imaginary circle of a large diameter which is the same radius of curvature as a circular arc on the outer circumferential side of the relief aperture 119. A reference character C2 designates an imaginary circle of a small diameter which is the same radius of curvature as a small diameter portion 117b of the outer circumferential portion of the central step 117 extending in parallel to the relief aperture 119. A portion of the outer circumferential portion of the central step 117 which is located between neighboring ends of the right and left relief apertures 119 forms an enlarged portion 117c which extends radially outward from the imaginary circle C2 of a small diameter to approach the imaginary circle C1 of a large diameter. The enlarged portions 117c are arranged opposite to each other across the center of the upper frame member 115, whereby the outer circumferential portion of the central step 117 is formed in such a noncircular shape that the imaginary circle C2 is partly transformed. A reference character C3 designates an imaginary circle contacting a portion of the outer circumference of the enlarged portion 117c.

By the way, the thick-walled outer circumferential section 132 of the elastic body 130 is fitted to the inner circumferential side of the annular partition wall 123 on the outside thereof while being fitted to the outer circumferential portion of the central step 117 of the upper frame member 115 on the inside thereof. Accordingly, the imaginary circle C1 of a large diameter corresponds to an outer diameter of the thick-walled outer circumferential section 132 and an inner diameter of the annular partition wall 123 (each being the diameter thereof excepting a width across flat portion as referred to later). The imaginary circle C2 of a small diameter corresponds to an inner diameter of the thick-walled outer circumferential section 132 and to an outer diameter of the central step 117 of the upper frame member 115 (each being the diameter of a small diameter portion).

Incidentally, as shown in FIG. 16, etc., the upper portion of the thick-walled outer circumferential section 132 is positioned by an outer step portion of the central step 117 of the upper frame member 115 so as to prevent a radially inward tilt, thereby contributing to the improvement in an opening and closing accuracy of the relief valve 133.

Figure 20:
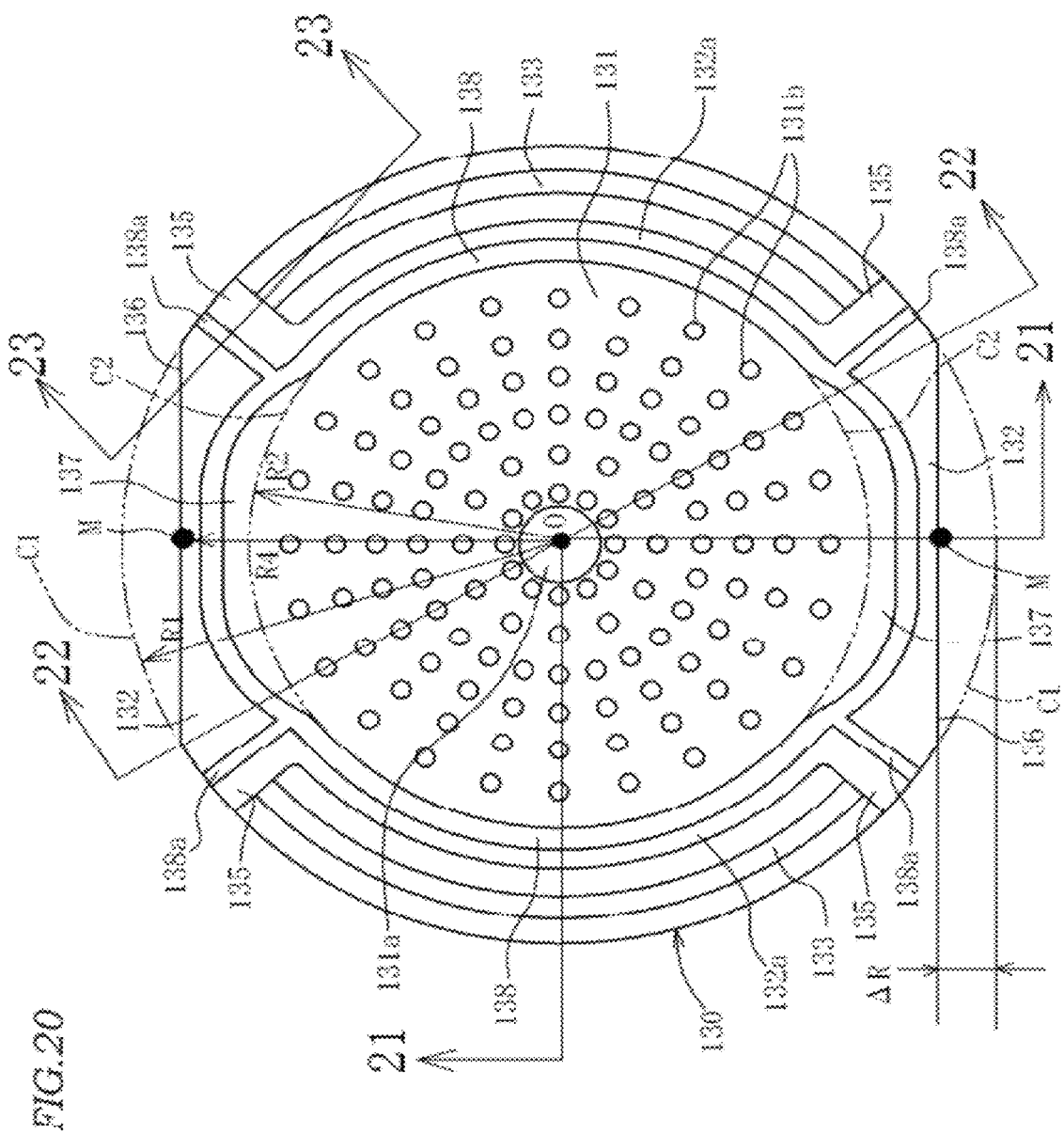
FIG. 20 is a plan view of an elastic body.
Figure 21:
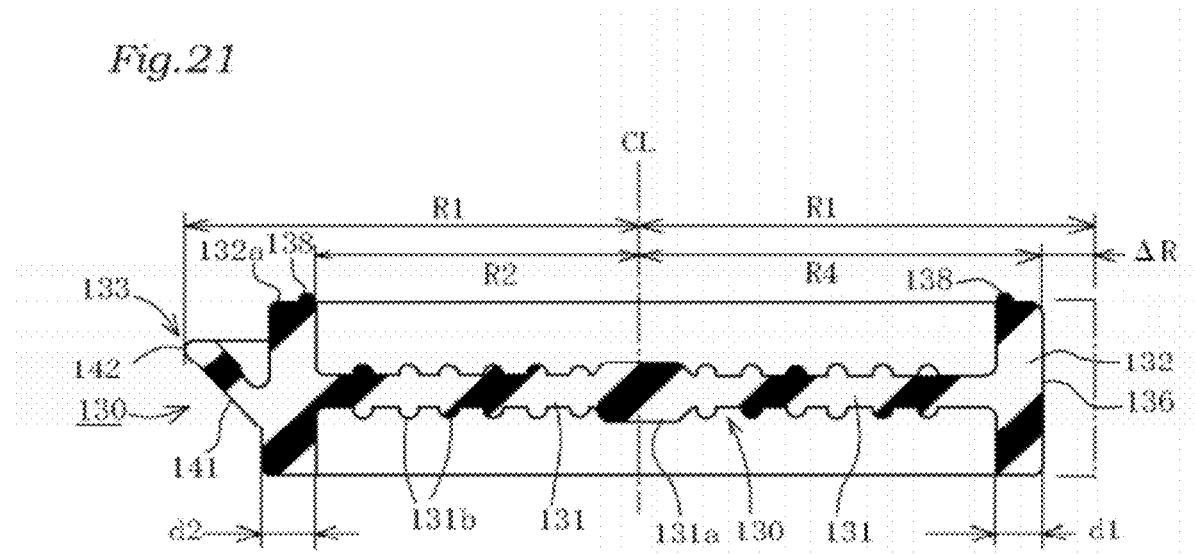
FIG. 21 is a cross sectional view taken along line 21-21 of FIG. 20.
Figure 22:
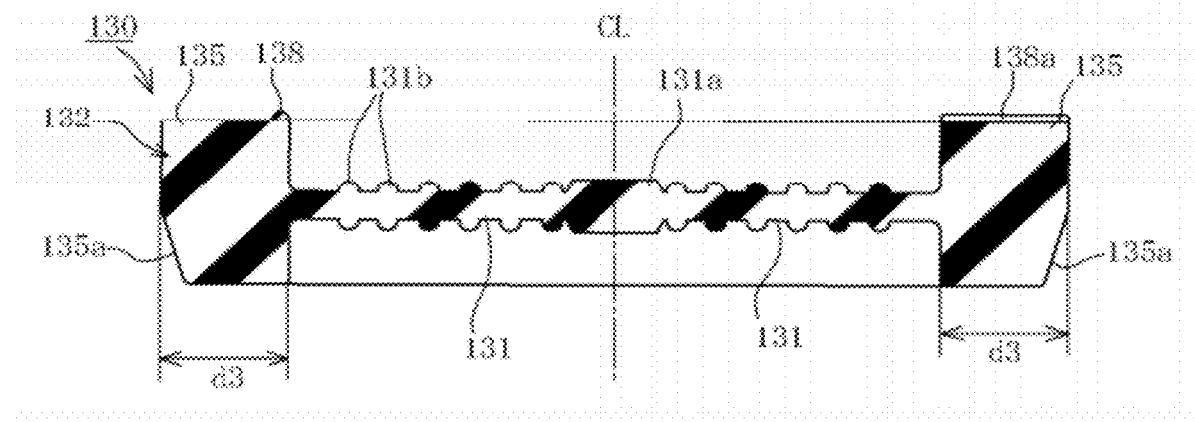
FIG. 22 is a cross sectional view taken along line 22-22 of FIG. 20.
Figure 23:
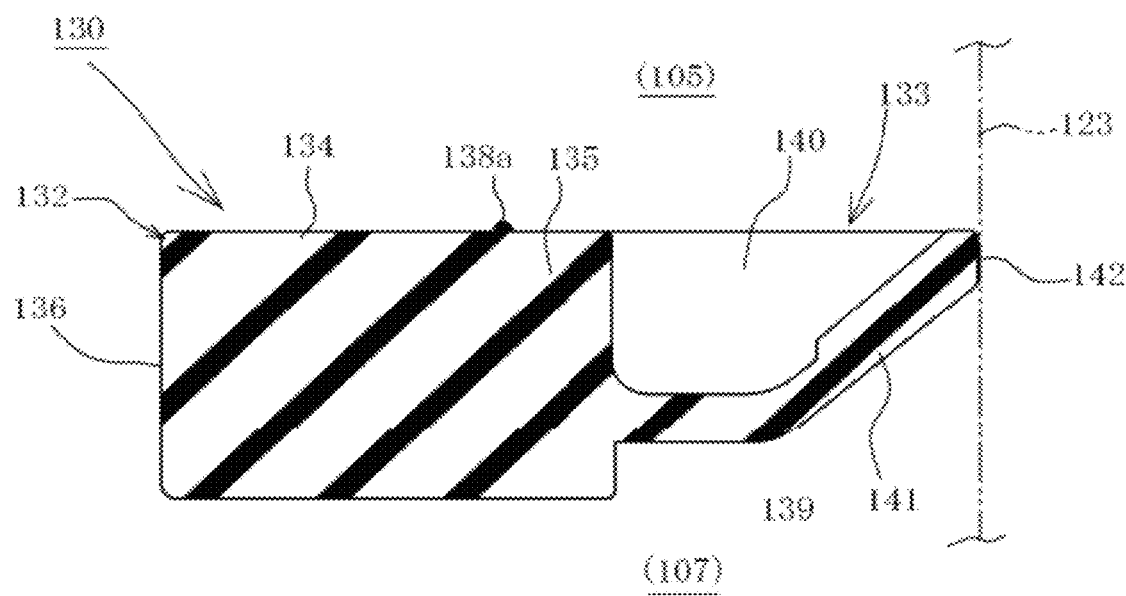
FIG. 23 is a cross sectional view taken along line 23-23 of FIG. 20.

Next, the elastic body 130 will be described hereunder. FIG. 20 is a plan view of the elastic body, FIG. 21 is a cross sectional view taken along line 21-21 of FIG. 20, FIG. 22 is a cross sectional view taken along line 22-22 of FIG. 20 and FIG. 23 is a cross sectional view taken along line 23-23 of FIG. 20. As shown in FIGS. 20-23, the elastic body 130 is formed of proper materials rich in elasticity such as rubber or the like and has a shape and size capable of being fitted into the fitting space 127 of the lower frame member 116.

Namely, the thick-walled outer circumferential section 132 has a pair of valve sections 132a an outer circumferential portion of which fits the imaginary circle C1 of a large diameter and is arranged opposite to each other across a center O and a pair of width across flat sections 136 which is also arranged opposite to each other. Four corner sections 135 are provided on both ends in the longitudinal direction of each of the valve sections 132a, and each of the corner sections 135 is oppositely arranged across the center O.

The pair of width across flat sections 136 corresponds to a shape cutting in parallel the opposite portions of the imaginary circle C1 of a large diameter. A pair of opposed straight portion formed in parallel on an outer peripheral side of the width across flat section 136 corresponds to a chord of the imaginary circle C1 of a large diameter. With the provision of this width across flat section 136, the elastic body 130 is formed in a noncircular shape as a whole.

Namely, as shown in FIG. 20, when a radius of the imaginary circle C1 of a large diameter and a radius of the imaginary circle C2 of a small diameter are each R1 and R2 and a radius at a middle point M of the width across flat section 136 (a distance between the middle point M and the center of the elastic body 130) is R4, R4 is shorter than R1 by ΔR by the formation of a cutout section 134. R3 is a radius of the imaginary circle C3.

The outer circumferential portion of the movable diaphragm section 131 bordering the thick-walled outer circumferential section 132 has a noncircular shape corresponding to the outer circumferential portion of the central step 117. Namely, while the portion extending in parallel to the valve section 132a forms the small diameter portion to fit with the imaginary circle C2 of a small diameter, the portion extending along the width across flat section 136 forms an enlarged portion 137 and protrudes radially outward from the imaginary circle C2 of a small diameter to the width across flat section 136, whereby the movable diaphragm section 131 is formed in a noncircular shape.

The width across flat section 136 and the valve section 132a are arranged alternately in the longitudinal direction. The length in the longitudinal direction of each of the relief valves 133 is about ⅓ (a third) of the full circumference of the imaginary circle C1 of a large diameter while the outer circumferential portion of the width across flat section 136 formed in a straight shape in a plan view has the length of a chord corresponding to a circular arc of about ⅙ (a sixth) of the imaginary circle C1 of a large diameter. The corner sections 135 and the width across flat sections 136 form a detent section in the present invention.

As shown in FIG. 21, each of opposed surfaces of the width across flat sections 136 forms a vertical surface which extends in parallel to a center axis of the elastic body. The width in the radial direction of the cutout section 134 designated as a thick-wall portion in FIG. 21 is narrowest at the middle point M and is gradually enlarged toward the corner section 135.

However, the width d1 in the radial direction of the width across flat section 136 at the middle point M is somewhat narrower than the width d2 in the radial direction of the valve section 132a (the width in the radial direction of a basal portion excepting the relief valve 133).

Further, as shown in FIG. 22, the width d3 in the radial direction of the corner section 135 is several times as wide as the width d1 in the radial direction of the width across flat section 136 at the middle point M and the width d2 in the radial direction of the valve section 132a. On a lower portion of the outer wall of the corner section 135, a taper wall 135a is provided.

As shown in FIG. 23, the corner section 135 is a thick wall portion to which the relief valve 133 is connected. When the relief valve 133 is pulled toward the intermediate portion in the longitudinal direction thereof by receiving the hydraulic pressure of the primary liquid chamber 105, the corner section 135 forms a support portion for fixedly supporting the end in the longitudinal direction of the relief valve 133 so as not to be tilted toward the pulled direction.

By the way, since the thick-walled width across flat sections 136 including the corner sections 135 connect each of the ends in the longitudinal direction of the pair of relief valves 133 whereby the entire portion located between the pair of relief valves 133 supports each of the ends in the longitudinal direction of the relief valves 133 by the thick-walled construction of enough length corresponding to about ⅙ (a sixth) of the outer circumference, the rigidity for supporting the relief valves 133 can be sufficiently increased.

On the surface of the elastic body 130, a noncircular annular seal 138 is formed along the outer circumference of the movable diaphragm section 131. Also, on the surface of each of the corner sections 135, there are formed radial seals 138a which connect with and branch from the annular seal 138 so as to extend outward in the radial direction. When the partition member 106 is assembled, the seal between the movable diaphragm section 131 and the valve section 132a is accurately performed by these seals.

In the center of the movable diaphragm section 131 of the elastic body 130, convex portions 131a are integrally provided such as to project upward and downward. On the concentric circles surrounding the convex portion 131a, a plurality of hemispherical small projections 131b integrally provided such as to project from the upper and lower surfaces of the movable diaphragm section 131 (a reference character being affixed only on the limited number thereof).

The small projections 131b are arranged at regular intervals on a concentric circle, and there are formed a plurality of such concentric rows (six rows in this embodiment) in the radial direction.

When the movable diaphragm section 131 is elastically deformed, the small projections 131b initially come into contact with the upper and lower deformation restriction frames 118a (FIG. 18), 128a (FIG. 24) at a small contact area so as to reduce a beat sound.

As shown in FIG. 21 and FIG. 23, the relief valve 133 is formed integral with a portion of the valve section 132a and provided in a substantially V-shaped cross section with a concave portion 140 which is opened toward the primary liquid chamber 105. A radially outward wall portion surrounding the concave portion 140 forms a slant wall 141 which extends obliquely upward from the side of the secondary liquid chamber 107 to the side of the primary liquid chamber 105 to be opened outward. The distal end portion of this slant wall 141 forms a thick-walled seal portion 142 the outer surface side of which fluid-tightly contacts the inner circumferential surface of the annular partition wall 123.

Figure 24:
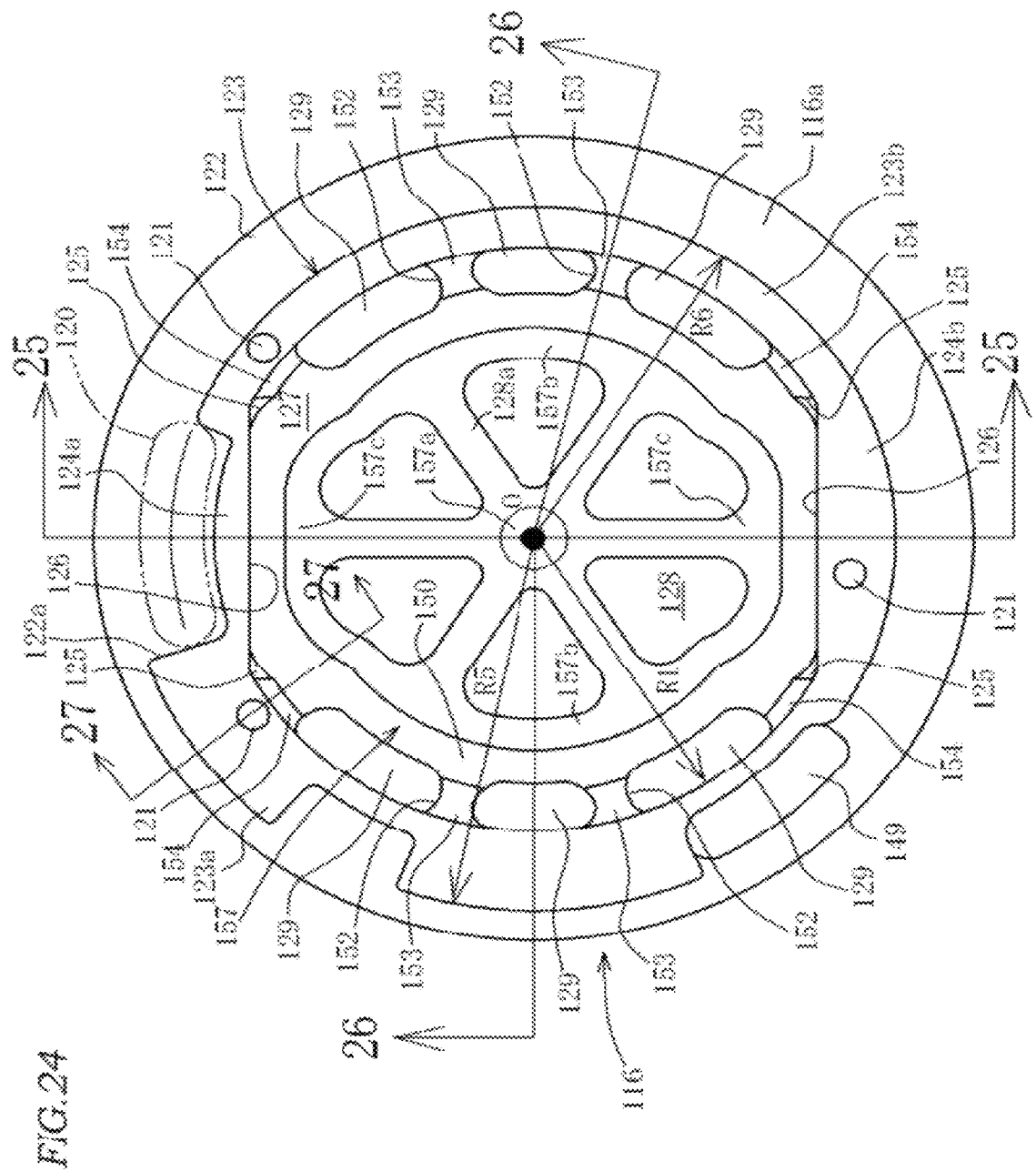
FIG. 24 is a plan view of a lower frame member.
Figure 25:
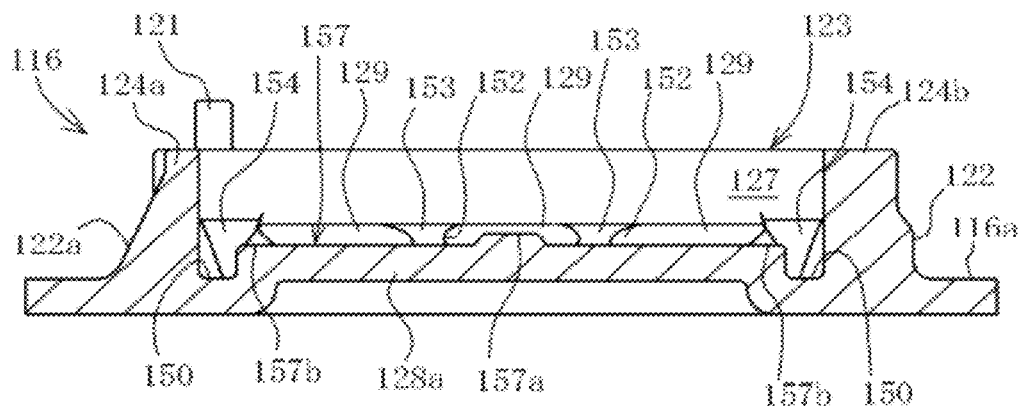
FIG. 25 is a cross sectional view taken along line 25-25 of FIG. 24.
Figure 26:
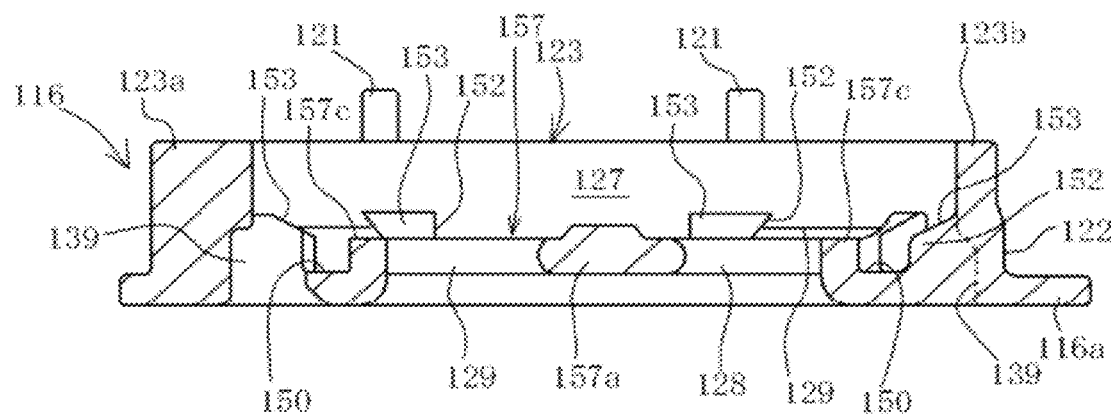
FIG. 26 is a cross sectional view taken along line 26-26 of FIG. 24.
Figure 27:
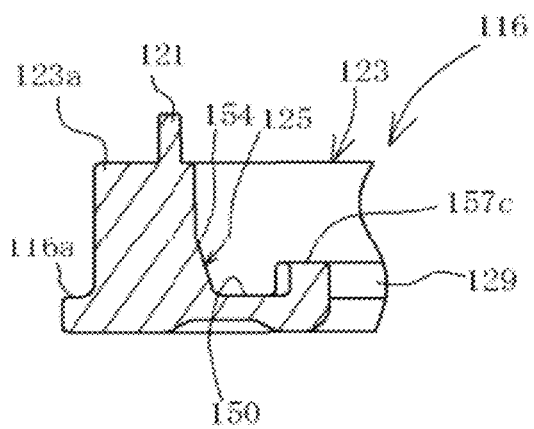
FIG. 27 is a cross sectional view taken along line 27-27 of FIG. 24.

Next, the lower frame member 116 will be described with reference to FIGS. 15-17 and 24-27. FIG. 24 is a plan view of the lower frame member 116, FIG. 25 is a cross sectional view taken along line 25-25 of FIG. 24, FIG. 26 is a cross sectional view taken along line 26-26 of FIG. 24, and FIG. 27 is a cross sectional view taken along line 27-27 of FIG. 24.

As shown in FIG. 24, the lower frame member 116 has a circular shape in a plan view and is formed of proper materials such as a light metal, a hard resin and the like which have rigidity. On the inside of the outer circumference, there is provided the annular partition wall 123, and on the inside of the annular partition wall 123, there is provided a noncircular central step section 157 across a noncircular annular groove 150.

The inner circumferential surface of the annular partition wall 123 is formed in a noncircular shape and has a pair of opposed circular sections 123a and 123b which fits with the imaginary circle C1 of a large diameter (the radius R1) and a pair of similarly opposed width across flat sections 126.

Although the inner circumferences of the circular sections 123a and 123b are each located on the large imaginary line C1, the outer circumferences thereof have different radii. The radius of the outer circumference of the circular section 123a on which the concave portion 122 for the orifice passage is not formed is R5 while the radius of the outer circumference of the circular section 123b on which the concave portion is formed is R6 (R5>R6), so that the width in the radial direction of the circular section 123a is larger than the width in the radial direction of the circular section 123b on the opposite side by that difference (see FIG. 24).

Further, the widths in the radial direction of portions 124a and 124b on which the width across flat sections 126 are formed are different from each other. The portion 124a on which an enlarged end 122a located on the one end in the longitudinal direction of the concave portion 122 is formed has a narrow width in the radial direction in a substantially crescent shape while the opposite portion 124b on the side of the secondary liquid chamber side opening 149 has a larger width in the radial direction in a substantially greater crescent shape.

On an inner circumferential surface of the annular partition wall 123, the circular section 123a formed at a divergent angle of 120° in a circular arc of about ⅓ (a third) of the full circumference and the width across flat section 126 of a divergent angle 60° are arranged alternately and each provided in pairs in opposed relation. Moreover, four corner sections 125 are provided on both ends in the longitudinal direction of each of the circular sections 123a, and each of the corner sections 125 is arranged in an opposed relation across the center O.

The width across flat section 126 is formed partly in a flat shape and adapted to tightly fit with the width across flat section 136 when the elastic body is fitted into the inside of the annular partition wall 123.

The annular groove 150 is formed as a groove for engaging and supporting the lower portion of the thick-walled outer circumferential section 132 and is opened upward. The bottom of the annular groove 150 has the same shape in a plan view as the bottom wall of the thick-walled outer circumferential section 132 and is lower than the central step section 157.

The groove width of the annular groove 150 varies in the circumferential direction such that it is widened between each of the circular sections 123a and 123b of the annular partition wall 123 and a small diameter portion 157b of the central step section 157 while it is narrowed between the width across flat section 126 and an enlarged portion 157c.

The central step section 157 is a portion for supporting the bottom of the movable diaphragm section 131 with a space left in-between and the shape in a plan view of the outer circumference corresponds to the outer circumferential shape of the movable diaphragm section 131. Therefore, it is formed in a noncircular shape with the small diameter portion 157b which fits with the imaginary circle C2 of a small diameter and the enlarged portion 157c which extends radially outward from the imaginary circle C2 of a small diameter.

The central step section 157 is located across the annular groove 150 on the inside of the annular partition wall 123 and formed as a one-step raised step of a noncircular shape in a plan view. In the center region of the central step 157 a central fixing protrusion 157a is formed so as to initially come into contact with the convex portion 131a provided in the center of the movable diaphragm section 131.

Around the central fixing protrusion 157a, the central lower opening 128 which communicates with the primary liquid chamber 105 is formed and partitioned by a plurality of the radially extending deformation restriction frames 128a (a reference character being affixed only on the limited number thereof). The deformation restriction frame 128a contacts the bottom side of the movable diaphragm section 131 at the time of the excessive elastic deformation thereby to restrict the excessive elastic deformation.

As shown in FIG. 25 and FIG. 26, the inner circumferential side of the annular groove 150 is surrounded with an upright outer circumferential wall of the small diameter portion 157b or the enlarged portion 157c. When the lower portion of the thick-walled outer circumferential section 132 is fitted to the annular groove 150, the upright outer circumferential wall of the small diameter portion 157b or the enlarged portion 157c each allows the lower portion on the inner circumferential side of the thick-walled outer circumferential section 132 to be fixed in position such that when the thick-walled outer circumferential section 132 is pulled inward in the radial direction due to the elastic deformation of the movable diaphragm section 131, the lower portion on the inner circumferential side of the thick-walled outer circumferential section 132 is not pulled out inward in the radial direction.

In the bottom region of the annular groove 150, the relief apertures 129 are formed along the circular sections 123a and 123b between the inner circumferential walls of the annular groove and the circular section. The relief aperture 129 is a circular arc shaped oblong opening in a plan view which is formed between the corner portions 125 located on each end of the circular sections 123a and 123b. In the intermediate region in the longitudinal direction of the relief aperture there are formed intermediate supports 152 each of which extends radially across the relief aperture.

In this embodiment, two intermediate supports 152 are provided for one relief aperture so as to partition the relief aperture 129 into three segments. These two intermediate supports 152 are located close to the center of the relief aperture at irregular intervals and the space between the two intermediate supports 152 is narrower than the space between the intermediate support and the corner section 125 so that it is possible to preponderantly support the intermediate portion of the relief valve 133 subject to large deformation The intermediate support 152 is formed in the shape of a rib which connects the outer circumferential portion of the annular groove 150 and the inner circumferential wall of the annular partition wall 123 so as to reinforce the peripheral portion of the relief aperture 129 because the relief aperture 129 is formed comparatively long to be about ⅓ (a third) in length of the imaginary circle C1 of a large diameter. At the same time, an upper end surface of the intermediate support 152 forms a taper wall 153 to support a slant wall 141 of the relief valve 133 on the lower side thereof (see FIG. 28(c)). With this construction, the relief valve 33 which is subject to sagging at the intermediate portion thereof due to the comparatively long formation is prevented from sagging, and the excessive deformation of the relief valve 33 at the time of great force input as referred to later is also prevented.

As shown in FIG. 26, the intermediate supports 152 are integrally provided along the inner circumferential surface of the annular partition wall 123 while projecting at a predetermined height and extending in the direction of the center axis. The position and inclination of the taper wall 153 are properly determined in consideration of the shape of the slant wall 141 of the relief valve 133 and the conditions thereof at the time of excessive deformation. In addition, one or more intermediate supports 152 may be optionally chosen.

Each of the corner sections 125 has a taper wall 154 which is formed with an inclined surface inclining downward to the bottom portion of the annular groove 150, on the side of the lower portion of the inner circumferential wall of the circular section 123a (see FIG. 27). This taper wall 154 corresponds to the taper wall 135a (FIG. 22) of the corner section 135 provided on the thick-walled outer circumferential section 132 of the elastic body 130 to form a tightly contacting high seal construction when being assembled. The taper walls 154 and 135a may have an identical or different inclination. In this embodiment, the taper wall 154 of the corner section 125 has the steeper inclination than the other. When being assembled, the corner section 135 of the elastic body 130 is tightly fitted on the corner section 125 of the lower frame member 125 so that the taper walls 135a and 154 can contact tightly each other.

Next, the assembling of the partition member 106 will be described. As shown in FIG. 17, when the elastic body 130 is fitted into the fitting space 127 of the lower frame member 16, the lower portion of the thick-walled outer circumferential section 132 is engaged into the annular groove 150 and the width across flat section 136 of the elastic body 130 comes into contact with the width across flat section 126 of the annular partition wall 123. Then, after each of the positioning pins 121 is inserted into the positioning hole 121a of the upper frame member 115, the tip end of each of the positioning pins 121 is caulked while pressing the upper frame member 115 on the elastic body 130 at the predetermined pressure, so that the partition member 6 is united and assembled.

At this time, since the width across flat section 136 of the outer circumferential portion of the elastic body 130 contacts the width across flat section 126 of the annular partition wall 123 as seen in FIG. 15, the elastic body 130 is accurately fixed in position, whereby each of the relief apertures 119 and 129 and each of the relief valves 133 can be reliably and easily aligned. As a result, it is possible to maintain the relief passage 139 in a constant state and to ensure the accurate opening closing operation of the relief valve 133.

Moreover, since the taper wall 135a is provided on the corner section 135 of the thick-walled outer circumferential section 132, it is taper joined and tightly fitted to the taper wall 154 of the corner section 125 thereby to enable the high seal construction to be obtained by assembling.

Further, the relief valve 133 is located on the inside of each of the circular sections 123a and 123b of the annular partition wall 123, and the seal portion 142 of the distal end portion of the slant wall 141 is fluid tightly fitted to the inside surface of the circular section 123b. Thus, the relief passage 139 is closed to prevent the hydraulic liquid flow through the relief passage 139 from the secondary liquid chamber 107 to the primary liquid chamber 105 (the same goes for the side of the circular section 123a).

Next, the operation will be described.

Figure 28A:
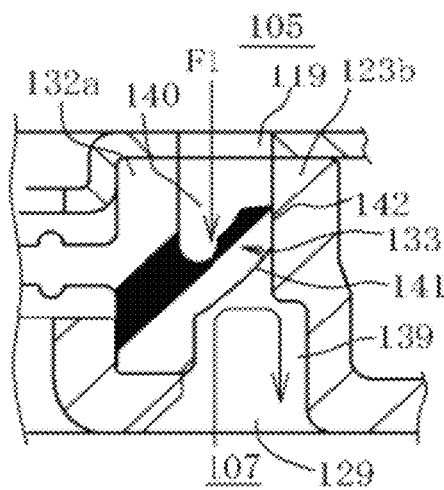
FIG. 28(a) is a cross sectional view of the relief valve when the great force is inputted in the closed condition.
Figure 28B:
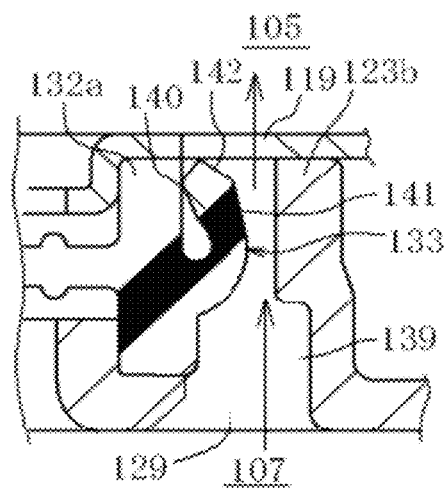
FIG. 28(b) is a cross sectional view of the relief valve when the direction of the vibration is reversed after the great force is inputted.
Figure 28C:
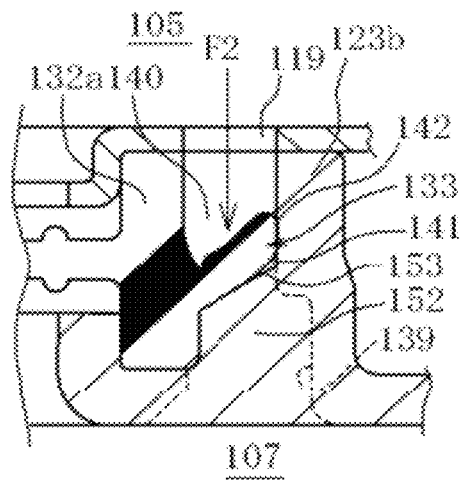
FIG. 28(c) is a cross sectional view of an intermediate support when an excessive hydraulic pressure operates.

FIGS. 28(a), 28(b) and 28(c) are views in explaining the operation of the relief valve 33, wherein FIG. 28(a) and FIG. 28(b) are enlarged views of a cross section similar to FIG. 16. FIG. 28(a) shows the state that the great force is inputted in the closed condition of the relief valve 133. In this state, the slant wall 141 is bent and swelled large downward thereby to receive the hydraulic pressure F1 by the great force input. Then, the seal portion 142 slides on the inner circumferential surface of the annular partition wall 123 to maintain contact therewith so as not to allow the hydraulic liquid to be relieved from the lower secondary liquid chamber 107 to the primary liquid chamber 105.

FIG. 28(b) shows the state that after the great force is inputted the direction of vibration is reversed and the volume of the primary liquid chamber 105 turns to the tendency toward an increase thereby to allow the primary liquid chamber 105 to turn to a negative pressure. At this stage, the slant wall 141 is drawn in suction toward the primary liquid chamber 105 and at the same time the hydraulic liquid on the side of the secondary liquid chamber 107 pushes the slant wall 141 upward. Therefore, the slant wall 141 is such deformed from the distal end thereof as to be peeled off, and soon the seal portion 142 is separated from the inner circumferential surface of the annular partition wall 123 to be opened. Then, the hydraulic liquid flows from the secondary liquid chamber 107 to the primary liquid chamber 105 via the relief aperture 129, the relief passage 139 and the relief aperture 119 to increase the hydraulic pressure of the primary liquid chamber 105 so that the occurrence of the cavitation phenomenon can be prevented.

At this time, since the distal end side of the slant wall 141 is inclined toward the primary liquid chamber 105, the hydraulic liquid is guided along this slant wall 141 and operates concentratedly on the seal portion 142. Therefore, when the primary liquid chamber 105 turns to the predetermined negative pressure, the relief valve 133 is smoothly opened.

FIG. 28(c) is an enlarged cross sectional view taken on the location of the intermediate support 152 in explaining the operation of the intermediate support 152 and shows the state that the excessive hydraulic pressure F2 operates due to the excessive force input. In this state, according to the present invention, the taper wall 153 of the intermediate support 152 supports the lower portion of the slant wall 141 at the intermediate position in the longitudinal direction of the relief valve 133. Thus, by supporting the intermediate portion in the longitudinal direction subject to largest deformation, the excessive deformation of the slant wall 141 is able to be prevented. Therefore, the leak due to the excessive deformation is prevented thereby allowing the decrease of the damping force to be prevented.

Therefore, in such a condition that the cavitation phenomenon occurs upon great force inputting, the predetermined amount of the relief flow is obtained so that the occurrence of the cavitation phenomenon can be steadily prevented.

Besides the above, since the relief amount at the time of valve opening is increased by enlarging the relief valve 133 to perform a prompt adjustment of the hydraulic pressure, it is possible to allow the relief valve to be comprised of only a pair. Also, since the intermediate portion in the longitudinal direction of the relief valve 133 is supported by the intermediate support 152, the substantial use of such large-sized relief valve 133 can be allowed. In addition, while increasing an opening area of the relief apertures 119, 129 to ensure the large relief amount, the strength of the lower frame member 116 is obtained enough by providing the intermediate support 152 for such large opened relief aperture 129, whereby it is possible to employ the lower frame member 116 having such large opening area.

Further, since the relief valve 133 extends long to about ⅓ (a third) of the circumferential length of the imaginary circle C1 of a large diameter, the flow amount of the hydraulic liquid at the time of relief is increased so that the occurrence of the cavitation phenomenon can be effectively prevented. Moreover, only a pair suffices for the relief valve 133 and it is not required to provide four relief valves as seen in the past. Thus, the number of the relief valve 133 can be reduced by half, and the volume of the thick-walled outer circumferential section 132 serving as the fixing section at each end in the longitudinal direction of the relief valve 133 can be enlarged thereby to make it possible to increase the supporting rigidity and to prevent the liquid leak.

Further, while the portion of the relief valve 133 which is hardest to bend is the connecting portion to the corner section 135 at each end in the longitudinal of the relief valve, the number of such portion can be reduced by half by reducing the number of the relief valve 133 by half, so that the operability of the relief valve 133 can be relatively improved.

Furthermore, by providing only one pair of opposed relief valves 133, the thick-walled outer circumferential section 132 between the relief valves 133 can be ensured comparatively wide (width corresponding to a divergent angle of about 60° in this embodiment). As a result, the portion of the thick-walled outer circumferential section 132 located between the pair of opposed relief valves 133 can be ensured for a sufficiently wide space (a space not forming the relief valve 133) to form the width across flat section 136 by cutting the outer circumferential side and the enlarged portion 137 on the inside thereof.

Therefore, the movable diaphragm section 131 can be provided in a noncircular large-sized form to increase the pressure receiving area. Therefore, although the relief valve is provided on the outer circumferential section, the spring constant of the movable diaphragm section can be decreased thereby making it possible to realize the low dynamic spring constant. Besides, the device can be made compactly without enlarging the size in an external diameter of the device and the movable diaphragm section is not required to be thinned more than enough in realizing the low dynamic spring constant, whereby the predetermined damping performance and the durability can be maintained.

Moreover, since the cylindrical metal fitting 111 and the extending portion 112 of the insulator 103 are used as an outer wall of the orifice passage 108 without providing the outer wall in the lower frame member 116, the orifice passage 108 can be arranged closer to the outer circumferential side. Thus, the inner circumferential wall of the annular partition wall 123 is enlarged to make the fitting space 127 greater so that the elastic body 130 to be fitted to the fitting space can be enlarged. As a result, the relief valve 133 to be provided in the elastic body 130 can be enlarged and the width across flat section 136 can be increased in size enough to form the enlarged portion 137.

Further, the width across flat section 136 of the thick-walled outer circumferential section 132 on which the enlarged portion 137 is provided is fitted at a large area to the width across flat section 126 formed on the inner circumferential wall of the annular partition wall 123. Therefore, in the case where the swirl of the hydraulic liquid occurs and the force to rotate the elastic body 130 is caused by the swirling flow when the hydraulic liquid flows through the concave section 122 forming the orifice passage 108 from the primary liquid chamber 105 to the secondary liquid chamber 107 in the direction of an arrow in FIG. 15, the rotation of the elastic body 130 can be surely prevented. Thus, the relative positional relationship between the relief valve 133 and the relief aperture 129 can be maintained accurately so as to make it possible to keep the relief passage 139 constant.

The present invention is not limited to the above embodiment but may be variously embodied. For example, the detent section may be formed by forming the outer circumference of the thick-walled outer circumferential section 132 between the right and left relief valves 133 into a noncircular polygonal shape without a width across flat shape thereby to perform the detent function.

Figure 29:
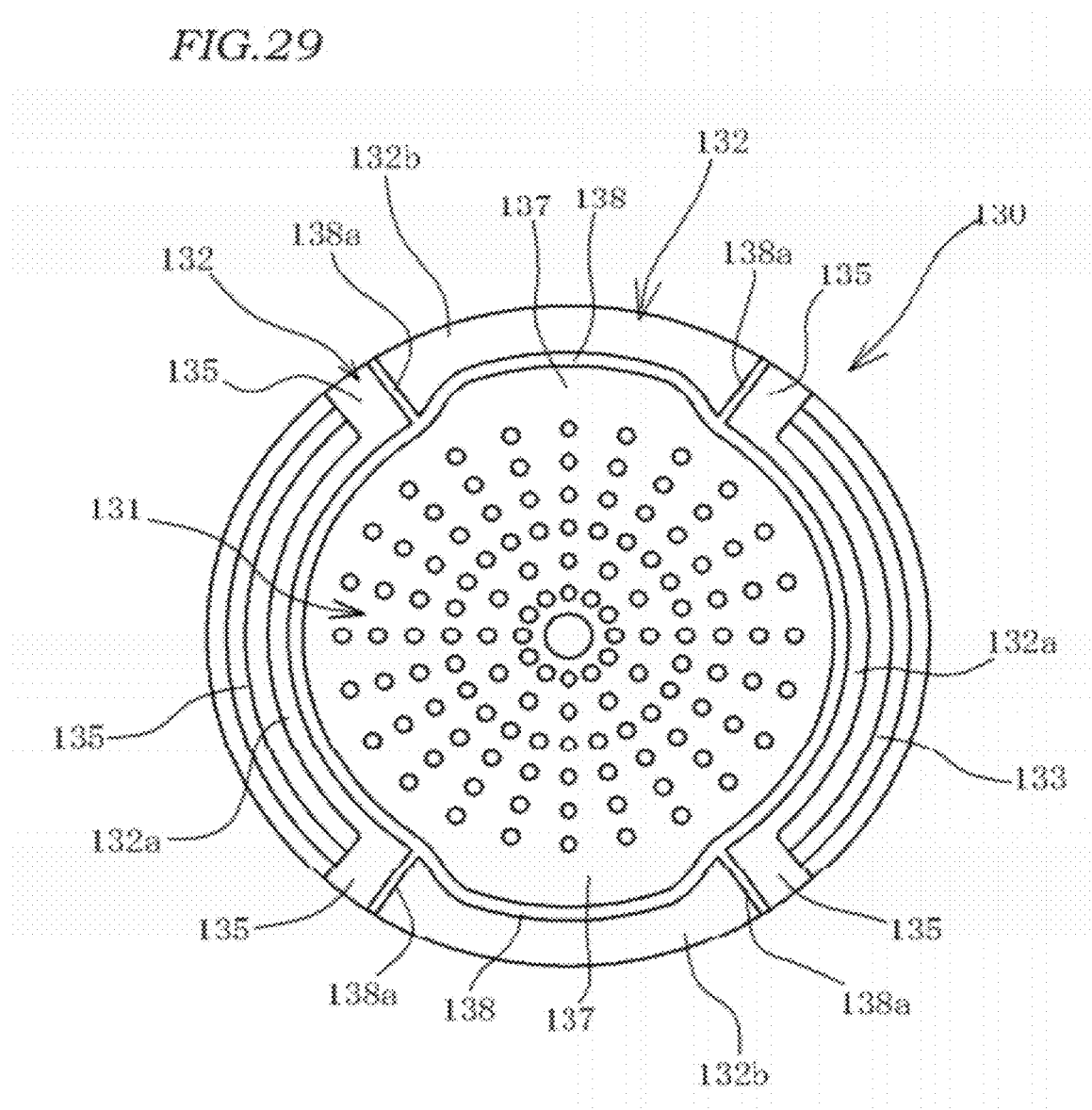
FIG. 29 is a plan view of another embodiment corresponding to FIG. 20.

FIG. 29 is an example of not having the width across flat shape as above. Instead of providing the width across flat sections 136 like in FIG. 15, a portion of a thick-walled outer circumferential section 132 on which an enlarged portion 137 is located is enlarged to provide a circular arc shaped enlarged section 132b which has a circular arc shaped outer circumference along the imaginary circle C1 of a large diameter and which is in series connected to a valve section 132a. With this construction, the enlarged portion 137 can be extended further to the outer circumferential side so as to provide a low dynamic spring constant. Alternatively, in the case where the enlarged portion 137 is not extended, the supporting rigidity of the circular arc-shaped enlarged section 132b can be enhanced so that the operation of the relief valve 133 and the movable diaphragm section 131 can be stabilized.

Further, the liquid sealed vibration isolating device of the present invention is not limited to the engine mount but applicable to various kinds of power train mounts.

What is claimed is:

1. A liquid sealed vibration isolating device comprising a liquid chamber being partitioned into a primary liquid chamber and a secondary liquid chamber, a partition member having an orifice passage which communicates between said primary liquid chamber and said secondary liquid chamber, an elastic body, a frame member for fitting said elastic body therein and supporting it thereon, said elastic body having a thin-walled movable diaphragm section in a central region thereof and a substantially ring shaped thick-walled outer circumferential section provided on a circumference of said movable diaphragm section, and a relief valve being integrally formed with said thick-walled outer circumferential section, wherein only a pair of relief valves is arranged in opposed relation to each other across a center of said elastic body, and a noncircular shaped detent section is formed on an outer circumferential portion of said thick-walled outer circumferential section which is located between the pair of relief valves, and wherein an engaging section corresponding to said detent section is provided on said frame member, and said detent section is engaged with said engaging section by fitting said elastic body into said frame member.

2. The liquid sealed vibration isolating device according to claim 1, wherein said movable diaphragm section is formed in a noncircular shape such that a portion of said movable diaphragm section extends into said thick-walled outer circumferential section located between the pair of relief valves.

3. The liquid sealed vibration isolating device according to claim 1, wherein said detent section is formed in a width across flat shape comprising straight lines which extend in parallel to each other in opposite positions of an outer circumference of said thick-walled outer circumferential section of said elastic body.

4. The liquid sealed vibration isolating device according to claim 1, further comprising a circular arc shaped relief aperture being provided in a position corresponding to said relief valve of said frame member, and an intermediate support portion for supporting said relief valve being formed in an intermediate position in a longitudinal direction of said relief aperture.

5. The liquid sealed vibration isolating device according to claim 1, wherein in the fitting position between said elastic body and said frame member at least a portion of said detent section of said elastic body and at least a portion of said engaging section of said frame member are formed in a taper shape.

6. The liquid sealed vibration isolating device according to claim 1, further comprising a corner section of said elastic body adjacent to an end in the longitudinal direction of said relief valve and a corner section of said frame member being provided to be engaged with said corner section of said elastic body, wherein each of said corner sections is formed in a taper shape.

7. The liquid sealed vibration isolating device according to claim 1, wherein said frame member is formed with an intermediate support for supporting said relief valve on the side of said secondary liquid chamber.

8. The liquid sealed vibration isolating device according to claim 1, further comprising a concave portion which forms said orifice passage being formed on said frame member with its outer lateral side open, and a closing member which closes the outer lateral side of said concave portion and an outer circumferential portion of said orifice passage and which serves as a cover member for covering each of outsides of said liquid chamber and said partition member.

9. The liquid sealed vibration isolating device according to claim 1, wherein said relief valve is formed in a circular arc shape along an imaginary circle and is about $\frac{1}{3}$ (a third) in length of a full circumference of the imaginary circle in the circumferential direction of said elastic body.

* * * * *